US010077887B2

(12) United States Patent
Son et al.

(10) Patent No.: US 10,077,887 B2
(45) Date of Patent: Sep. 18, 2018

(54) LIGHT EMITTING APPARATUS AND ILLUMINATION APPARATUS INCLUDING THE SAME

(71) Applicant: LG INNOTEK CO., LTD., Seoul (KR)

(72) Inventors: Chang Gyun Son, Seoul (KR); Ki Cheol Kim, Seoul (KR); Sung Phil Kim, Seoul (KR); Kang Yeol Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/248,259

(22) Filed: Aug. 26, 2016

(65) Prior Publication Data

US 2017/0067619 A1    Mar. 9, 2017

(30) Foreign Application Priority Data

Sep. 4, 2015    (KR) .................. 10-2015-0125321

(51) Int. Cl.
*F21V 1/00*    (2006.01)
*F21V 13/08*    (2006.01)
(Continued)

(52) U.S. Cl.
CPC .............. *F21V 13/08* (2013.01); *F21S 41/14* (2018.01); *F21S 41/16* (2018.01); *F21S 41/321* (2018.01); *F21S 43/13* (2018.01); *F21S 43/31* (2018.01); *F21V 5/04* (2013.01); *F21V 7/06* (2013.01); *F21V 9/30* (2018.02); *F21V 29/70* (2015.01); *G02B 19/0028* (2013.01);
(Continued)

(58) Field of Classification Search
CPC . F21V 13/08; F21V 29/70; F21V 5/02; F21V 5/04; F21V 7/06; F21V 9/16
USPC ........................................................ 362/235
See application file for complete search history.

(56) References Cited

U.S. PATENT DOCUMENTS

2005/0024479 A1    2/2005    Itabashi et al.
2013/0027962 A1*   1/2013    Takahashi ............ F21S 48/1145
                                                          362/538
(Continued)

FOREIGN PATENT DOCUMENTS

DE    10 2013 226 639    6/2015
JP         3648368       5/2005
JP       2014-026195     2/2014

OTHER PUBLICATIONS

European Search Report dated Jan. 5, 2017 issued in Application No. 1618644.2.
(Continued)

*Primary Examiner* — Elmito Breval
*Assistant Examiner* — Meghan Ulanday
(74) *Attorney, Agent, or Firm* — KED & Associates, LLP

(57) ABSTRACT

A light emitting apparatus is provided. The light emitting apparatus may include a light source device that emits a plurality of laser beams in parallel, a light transmission device that gathers the plurality of laser beams emitted from the light source device into a single beam and outputs the single beam to a focus, a wavelength conversion device that converts the wavelength of the single beam on the focus, and a housing to receive the light source device, the light transmission device, and the wavelength conversion device.

18 Claims, 42 Drawing Sheets

(51) Int. Cl.
*G02B 27/28* (2006.01)
*G02B 19/00* (2006.01)
*F21V 29/70* (2015.01)
*F21V 5/04* (2006.01)
*F21V 7/06* (2006.01)
*F21S 41/14* (2018.01)
*F21S 41/32* (2018.01)
*F21S 43/13* (2018.01)
*F21S 43/31* (2018.01)
*F21S 41/16* (2018.01)
*F21V 9/30* (2018.01)
*F21W 102/00* (2018.01)
*F21Y 115/30* (2016.01)
*G02B 5/04* (2006.01)

(52) U.S. Cl.
CPC ....... *G02B 19/0052* (2013.01); *G02B 27/283* (2013.01); *F21W 2102/00* (2018.01); *F21Y 2115/30* (2016.08); *G02B 5/04* (2013.01)

(56) References Cited

U.S. PATENT DOCUMENTS

| | | |
|---|---|---|
| 2014/0028981 A1 | 1/2014 | Matsubara |
| 2014/0063779 A1 | 3/2014 | Bradford |

OTHER PUBLICATIONS

European Patent Office Communication dated Jul. 11, 2018 issued in Application No. 16 186 444.2.

\* cited by examiner

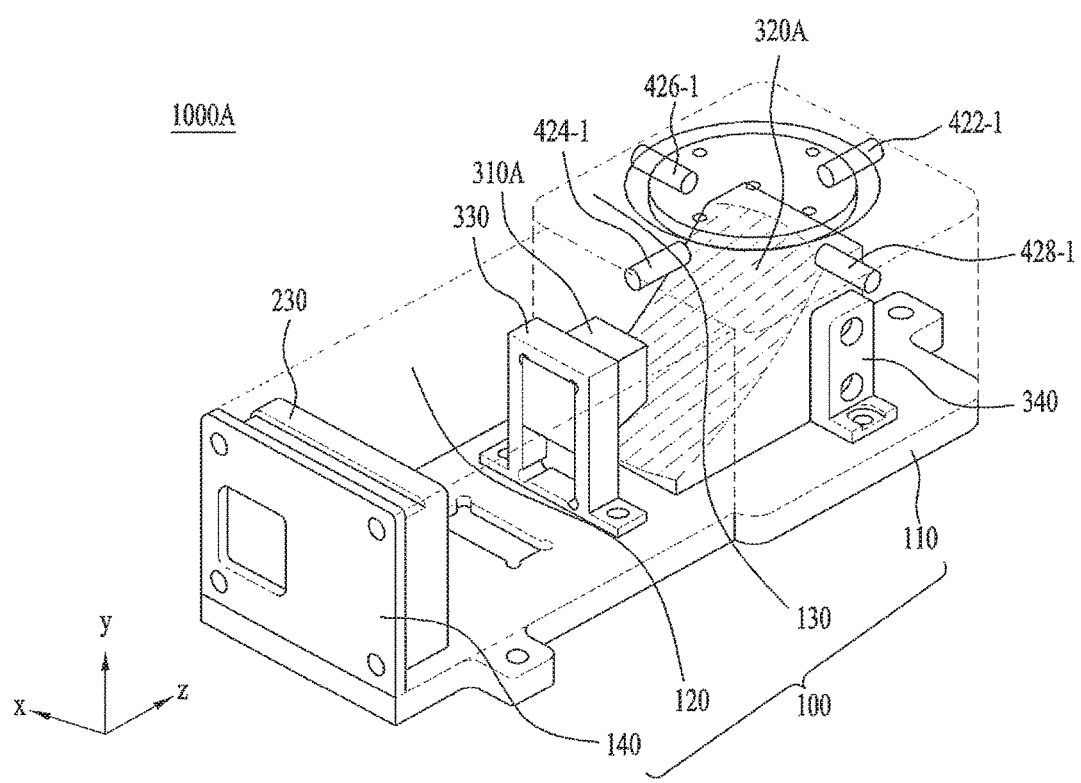

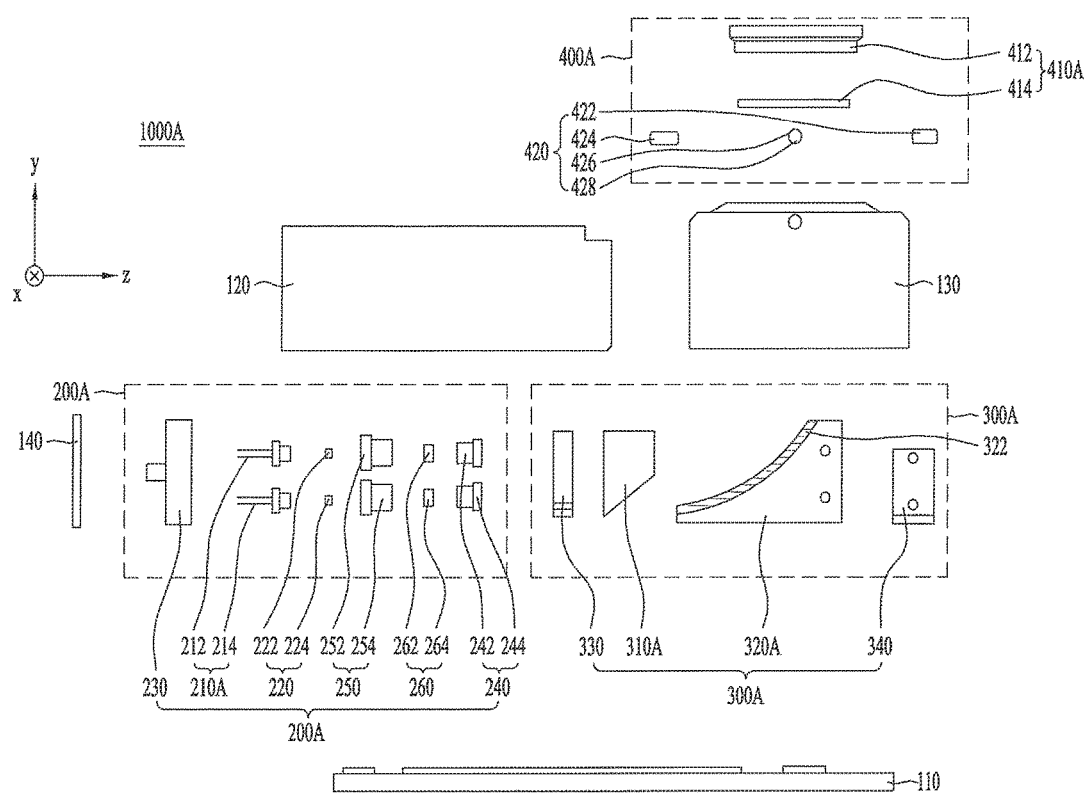

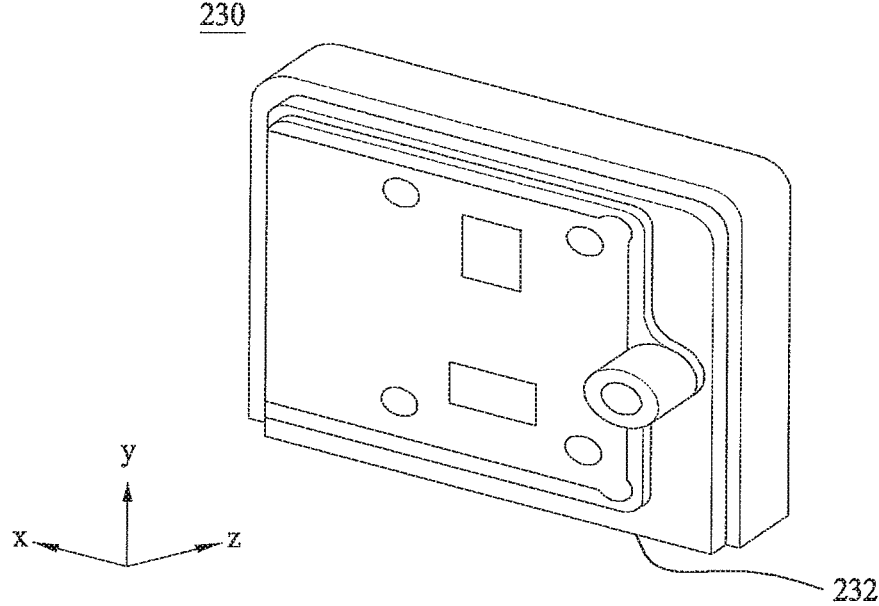
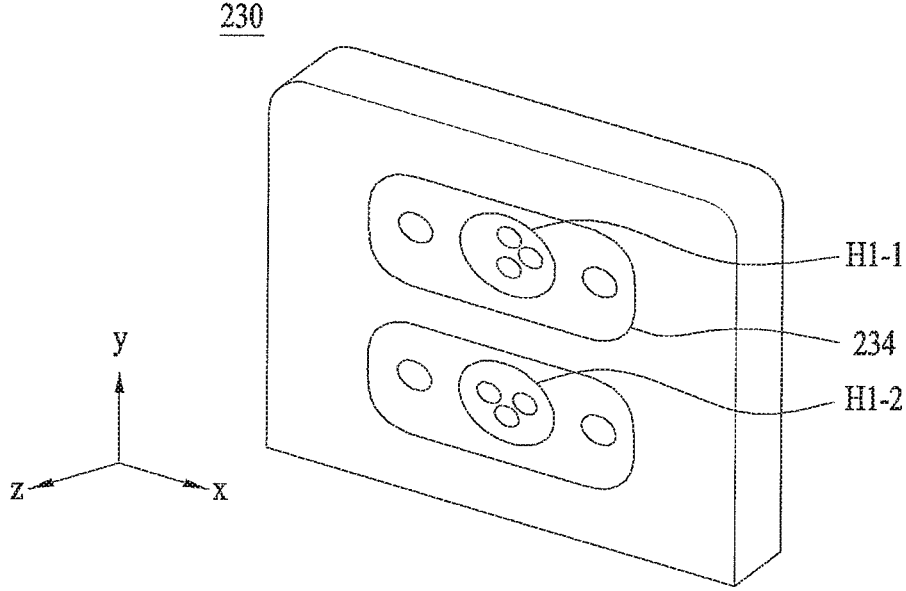

230

230

LIGHT EMITTING APPARATUS AND ILLUMINATION APPARATUS INCLUDING THE SAME

CROSS-REFERENCE TO RELATED APPLICATION

This application claims priority under 35 U.S.C. § 119 to Korean Application No. 10-2015-0125321 filed on Sep. 4, 2015, whose entire disclosure is incorporated herein by reference.

BACKGROUND

1. Field

Embodiments relate to a light emitting apparatus and an illumination apparatus including the same.

2. Background

A light emitting apparatus may be widely used for homes, in industry, and in vehicles. For example, a halogen lamp, a high-intensity discharge (HID) lamp, a xenon lamp, and/or a light emitting diode may be used as a light source of a light emitting apparatus mounted in a head lamp for vehicles. Increasing attention is being paid to a laser diode (LD) as a next-generation light source. If a LD is used for vehicles, it may satisfy functional requirements, such as, e.g., long-distance irradiation and searchlight function, design, and efficiency as the LD may exhibit higher luminance while having a smaller area than other light sources and may exhibit unique characteristics, such as straightness and polarization.

A light emitting apparatus may include a plurality of light sources. It may be difficult to focus a plurality of beams emitted by the light sources on a single point, with the result that efficiency of the light emitting apparatus may be reduced, and a size of the beams may be increased, whereby function of the light emitting apparatus may be deteriorated. If the beams deviate from a focal point even a little, the beams may be emitted from a plurality of spots. Since tolerance for a focal position may not be given when manufacturing other light emitting apparatuses, as described above, it may be difficult to align a plurality of light sources, and this tolerance may be critical.

BRIEF DESCRIPTION OF THE DRAWINGS

The embodiments will be described in detail with reference to the following drawings in which like reference numerals refer to like elements wherein:

FIG. 3 is an upper assembled perspective view of an embodiment of the light emitting apparatus shown in FIG. 1;

FIG. 7 is an exploded front view of the light emitting apparatus shown in FIG. 3;

FIG. 8A to FIG. 8I are views showing various shapes of a light source base;

DETAILED DESCRIPTION

Figure 1:
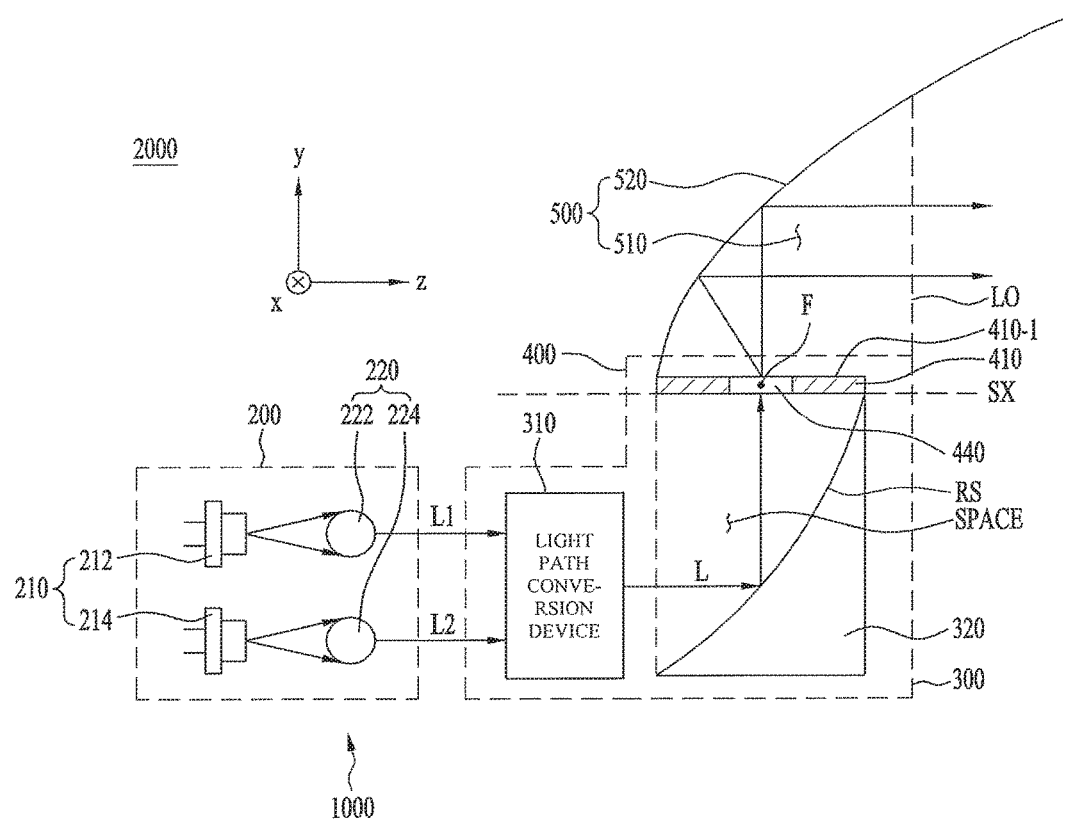
FIG. 1 is a view schematically showing an illumination apparatus including a light emitting apparatus according to an embodiment.

Referring to FIG. 1, an illumination apparatus 2000 according to an embodiment may include a light emitting apparatus 1000 and an illumination optical system 500. The illumination optical system 500 may be an example of the light emitting apparatus 1000, but the light emitting apparatus 1000 is not limited by a specific construction of the illumination optical system 500. The light emitting apparatus 1000 may be used together with another illumination optical system having a construction different from the illumination optical system 500 shown in FIG. 1. The light emitting apparatus 1000 may be used without the illumination optical system 500.

The light emitting apparatus 1000 may include a light source device 200, a light transmission device 300, and a wavelength conversion device 400. The light source device 200 may collimate a plurality of laser beams and output the collimated beams to the light transmission device 300. The light source device 200 may include a plurality of light sources 210 and a plurality of collimation lenses 220. The light source device 200 may be described as including two light sources for convenience of description. However, embodiments are not limited thereto.

The plurality of light sources 210 of the light source device 200 may include first and second laser light sources 212 and 214. The first and second laser light sources 212 and 214 may respectively emit first and second laser beams as the plurality of laser beams. The first laser light source 212 may emit the first laser beam, and the second laser light source 214 may emit the second laser beam. For example, the laser beam emitted by each of the first and second laser light sources 212 and 214 may have a wavelength of 420 nm to 480 nm, which is a blue wavelength. However, embodiments are not limited thereto.

The more power output from each of the first and second laser light sources 212 and 214, the better. The power output from each of the first and second laser light sources 212 and 214 may be changed depending on performance of the used wavelength conversion device 400 and purpose of use of the light emitting apparatus 1000.

The light source device 200 may include collimation lenses in a number equivalent to a number of light sources 212 and 214. In FIG. 1, the number of light sources 212 and 214 shown is two, and therefore the number of collimation lenses may be two. A first collimation lens 222 may collimate the first laser beam emitted from the first laser light source 212 and may output the collimated laser beam as a first collimated beam L1. A second collimation lens 224 may collimate the second laser beam emitted from the second laser light source 214 and may output the collimated laser beam as a second collimated beam L2.

The first and second collimation lenses 222 and 224 may have various shapes depending on emission characteristics of the first and second laser light sources 212 and 214. The first and second collimation lenses 222 and 224 may have different efficiencies depending on at least one selected from among size, material, surface conditions, surface coating or lack thereof, and shape thereof. For example, a ratio or efficiency of output to input of each of the first and second collimation lenses 222 and 224 may be 80% or higher. However, embodiments are not limited thereto. In addition, a divergence angle of the beam transmitted through each of the first and second collimation lenses 222 and 224 may be ±1 degree or less. However, embodiments are not limited thereto.

The light transmission device 300 may gather the first and second collimated beams L1 and L2 emitted from the light source device 200 into a single beam and output the single beam to a single focus on the wavelength conversion device 400. The light transmission device 300 may include a light path conversion device 310 and a reflection device 320. The light path conversion device 310 may convert paths of the first and second collimated beams L1 and L2 emitted from the light source device 200 so as to gather the first and second collimated beams L1 and L2 into a single beam L. The light path conversion device 310 may have various constructions depending on whether the first and second laser light sources 212 and 214 are arranged vertically, are arranged horizontally, or intersect each other. An overall size of the light emitting apparatus 1000 may be changed depending on whether the first and second laser light sources 212 and 214 are arranged vertically, are arranged horizontally, or intersect each other.

Figure 2A:
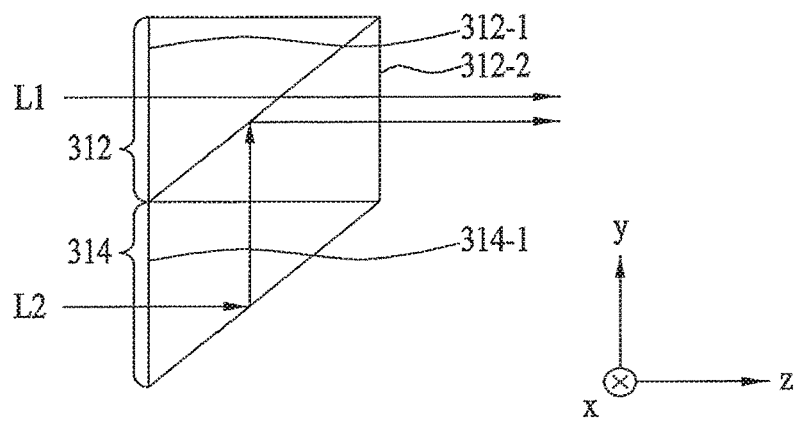
FIG. 2A to FIG. 2C are sectional views showing various embodiments of a light path conversion device shown in FIG. 1.
Figure 2B:
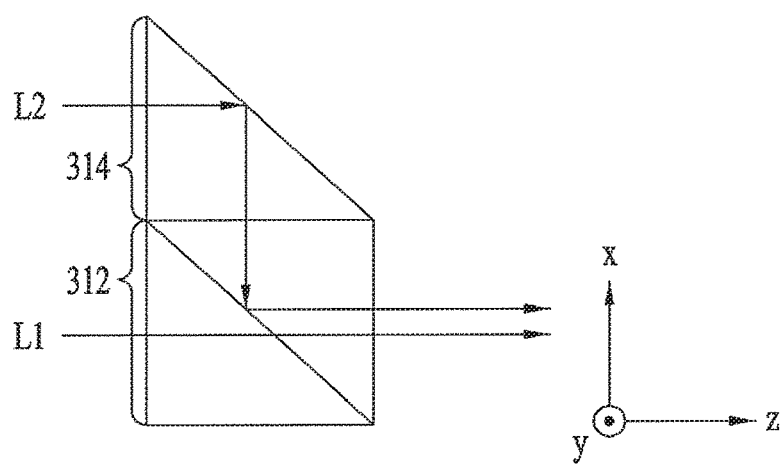
Figure 2C:
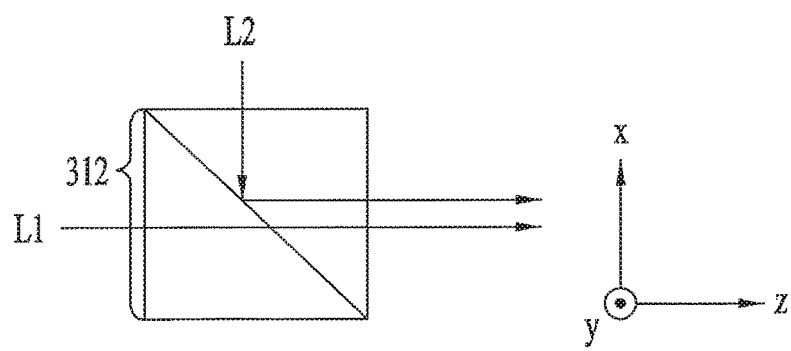

FIG. 2A to FIG. 2C show various embodiments 310A to 310C of the light path conversion device 310 shown in FIG. 1. If the first and second laser light sources 212 and 214 are arranged vertically or horizontally, the light path conversion devices 310A and 310B respectively shown in FIG. 2A and FIG. 2B may each include a light transmission and reflection device 312 and a prism 314.

If the first and second laser light sources 212 and 214 are arranged vertically, as shown in FIG. 2A, the first collimated beam L1 output from the first collimation lens 222 may be incident on the light path conversion device 310A in a first direction, for example, in the z-axis direction, and the second collimated beam L2 output from the second collimation lens 224 may be incident on the light path conversion device 310A in a direction parallel to the first direction. The prism 314 may reflect the second beam L2 in a second direction, for example, in the y-axis direction, which may be perpendicular to the first direction. The light transmission and reflection device 312 may transmit the first beam L1 in the first direction and reflects the second beam L2, which has been reflected by the prism 314, in the first direction. As a result, a single beam may be output from the light path conversion device 310A in the first direction. The first beam L1 may advance in a TM mode, and the second beam L2 may advance in a TE mode. A transmittance of the first beam L1 may be 95% or more, and a reflectance of the second beam L2 may be 95% or more. However, embodiments are not limited thereto.

If the first and second laser light sources 212 and 214 are arranged horizontally, as shown in FIG. 2B, the prism 314 may reflect the second beam L2, incident thereon in the direction parallel to the first direction in which the first beam L1 may be incident thereon, in a direction perpendicular to the first and second directions, for example, in the x-axis direction; hereinafter, referred to as a 'third direction'. The light transmission and reflection device 312 may transmit the first beam L1 in the first direction and reflect the second beam L2, which has been reflected in the third direction by the prism 314, in the first direction. As a result, a single beam L may be output.

If the first and second laser light sources 212 and 214 intersect each other, as shown in FIG. 2C, instead of being arranged vertically or horizontally, the light path conversion device 310C may include only a light transmission and reflection device 312. Referring to FIG. 2C, the light transmission and reflection device 312 may transmit the first beam L1 in the first direction and reflect the second beam L2, which may be incident thereon in the third direction, in the first direction. As a result, a single beam L may be output.

In order to perform the above operation, the light transmission and reflection device 312 shown in each of FIG. 2A to FIG. 2C may include a polarization beam splitter (PBS) or a double refraction material, such as calcite. However, embodiments are not limited to a specific material of the light transmission and reflection device 312 as long as the light transmission and reflection device 312 gathers the plurality of beams into a single beam.

If the light transmission and reflection device 312 shown in each of FIG. 2A to FIG. 2C is implemented by a PBS, each of an incidence surface 312-1 and an exit surface 312-2 of the PBS and an incidence surface 314-1 of the prism 314 may be coated with an anti reflector (AR). However, embodiments are not limited thereto. For example, the anti reflector may have a reflectance of 0.5% or less. A y-axis length of the incidence surface 312-1 of the PBS 312 and a y-axis length of the incidence surface 314-1 of the prism 314 shown in each of FIG. 2A to FIG. 2C may be equal. Furthermore, a y-axis length and a z-axis length of the PBS 312 may be equal.

The reflection device 320 may reflect the single beam L output from the light path conversion device 310 to a focal point F. The reflection device 320 may have a parabolic sectional shape. However, embodiments are not limited thereto. A reflective surface RS of the reflection device 320, by which light may be reflected, may be mirror-coated. Alternatively, a mirror-coated transparent material may fill the space adjacent to the reflective surface RS of the reflection device 320.

The surface on which the single beam is incident may be perpendicular to a symmetric axis SX of the reflection device 320 shown in FIG. 1. If the space is filled with the transparent material, the difference in index of refraction between the wavelength conversion device 400 and the material filling the space may be within a predetermined range. If the space is filled with the transparent material, the reflective surface RS may need not mirror-coated as long as total reflection is achieved.

At least one selected from among focal distance, offset distance, and radius of curvature R of the parabolic reflecting mirror type reflection device 320 may be set based on an angle at which the beam having passed through the light path conversion device 310 is reflected by the reflection device 320. The angle at which the beam is reflected by the reflection device 320 may be changed, for example, into 0 degree of a vertical direction or other degree, depending on at least one selected from among a field to which the light emitting apparatus 1000 is applied, an arrangement of the first and second laser light sources 212 and 214, and external dimensions of the light emitting apparatus 1000.

The wavelength conversion device 400 may convert the wavelength of the single beam L focused on the focal point F and may output light having the converted wavelength to the illumination optical system 500. The wavelength conversion device 400 may include a material receiver 410 and a wavelength conversion material 440.

The material receiver 410 may include a space to receive the wavelength conversion material 440, and may have an exit through which light, the wavelength of which has been converted by the wavelength conversion material 440, may be output.

The wavelength conversion material 440 may be received in the material receiver 410 such that the focus F may be located on a center thereof. The wavelength conversion material 440 may convert the wavelength of the single beam L that has reached the focus F. The wavelength of the light reflected by the reflection device 320 may be changed while passing through the wavelength conversion material 440. However, not all beams that have been transmitted through the wavelength conversion material 440 may be beams having converted wavelengths.

The wavelength of the light reflected by the reflection device 320 may be changed by the wavelength conversion material 440, with the result that white light or light having a desired color temperature may be output through a light exit surface L0 of the illumination apparatus 2000. To this end, the wavelength conversion material 440 may include at least one selected from a phosphor, such as, e.g., a ceramic phosphor, a lumiphore, and a YAG single-crystal. The lumiphore may be a luminescent material or a structure including a luminescent material.

Light having a desired color temperature may be output from the illumination apparatus 2000 by adjusting at least one selected from among concentration, particle size, and particle size distribution of various ingredients included in the wavelength conversion material 440, thickness of the wavelength conversion material 440, and surface roughness of, or presence of air bubbles in, the wavelength conversion material 440. For example, the wavelength conversion material 440 may convert the wavelength band of light to fall within the range from 3000K to 9000K. Light having a wavelength converted by the wavelength conversion material 440 may have a color temperature range of 3000K to 9000K based on the color temperature. However, embodiments are not limited thereto. The wavelength conversion material 440 may be of various types. For example, the wavelength conversion material 440 may be of a phosphor in glass (PIG) type, a poly crystalline type (or a ceramic type), or a single crystalline type.

The more the difference in index of refraction between the wavelength conversion material 440 and air in a space 510 defined in the illumination optical system 500 is smaller, the more improved the light extraction efficiency of the illumination apparatus 2000 may be. The space 510 may be filled with a material having a small difference in index of refraction from the wavelength conversion material 440, rather than air.

The wavelength conversion device 400 may support an illumination reflector 520 of the illumination optical system 500. However, embodiments are not limited thereto. The illumination reflector 520 may be provided so as to be spaced apart from the wavelength conversion device 400, and may reflect light output from the wavelength conversion device 400. The illumination reflector 520 may reflect light having a wavelength that is not converted by the wavelength conversion device 400 as well as light having a wavelength that is converted by the wavelength conversion device 400. The illumination reflector 520 may have a cross-sectional round (or parabolic) shape. However, embodiments are not limited thereto.

If the illumination reflector 520 has a round (or parabolic) shape, it may be possible to advantageously collimate light output from an imaginary light exit surface L0. The illumination reflector 520 may include at least one selected from among an aspheric surface, a freeform curve surface, a Fresnel lens, and a holography optical element (HOE) according to a desired illuminance distribution. The freeform curve surface may be a shape having variously curved surfaces. If the Fresnel lens is used as the illumination reflector 520, the Fresnel lens may reflect light having a wavelength that is not converted by the wavelength conversion device 400 as well as light having a wavelength that is converted by the wavelength conversion device 400.

A surface 410-1 of the material receiver 410 that faces the illumination reflector 520 may be further provided with a reflective film. The reflective film may be attached to the surface 410-1 of the material receiver 410 in the form of a film, a coating, or a sheet. For example, the surface 410-1 of the material receiver 410 may be coated with metal in order to form the reflective film.

The aforementioned illumination apparatus 2000 shown in FIG. 1 may be applied to various fields. For example, the illumination apparatus 2000 may be applied to various types of lamps, such as, e.g., a low beam, a high beam, a taillight, a side lamp, a signal light, a day running light (DRL), and a fog lamp, which may all be for a vehicle, a flashlight, a signal light, and various kinds of illumination equipment. The illumination apparatus 2000 shown in FIG. 1 may be used together with various other illumination optical systems having constructions that differ from that of the illumination optical system 500 shown in FIG. 1. Alternatively, the light emitting apparatus 1000 may be used in the various fields without the illumination optical system 500. For example, the light emitting apparatus 1000 and the illumination apparatus 2000 may be applied to home or industrial display or indication apparatuses, in addition to vehicles.

Figure 4:
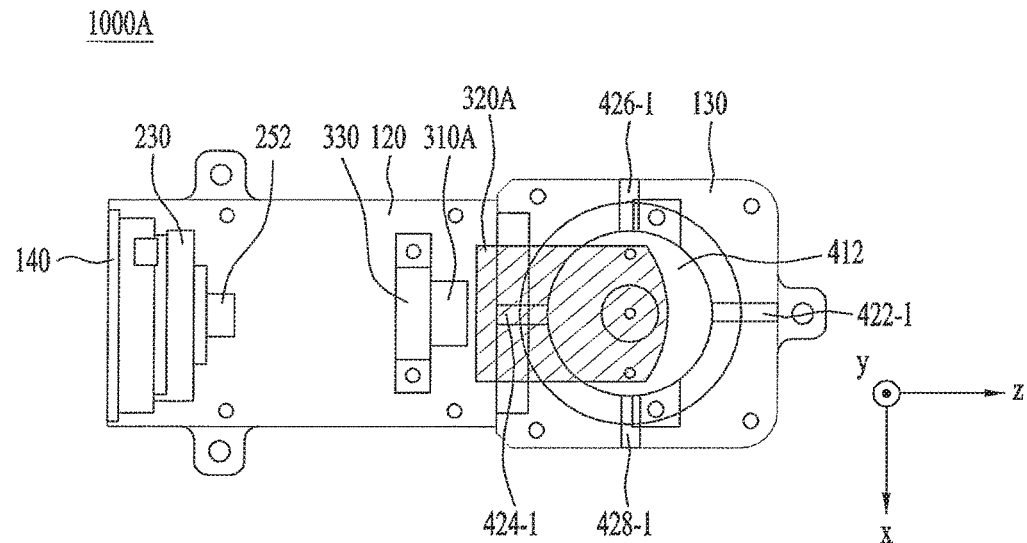
FIG. 4 is a plan view of the light emitting apparatus shown in FIG. 3.
Figure 5:
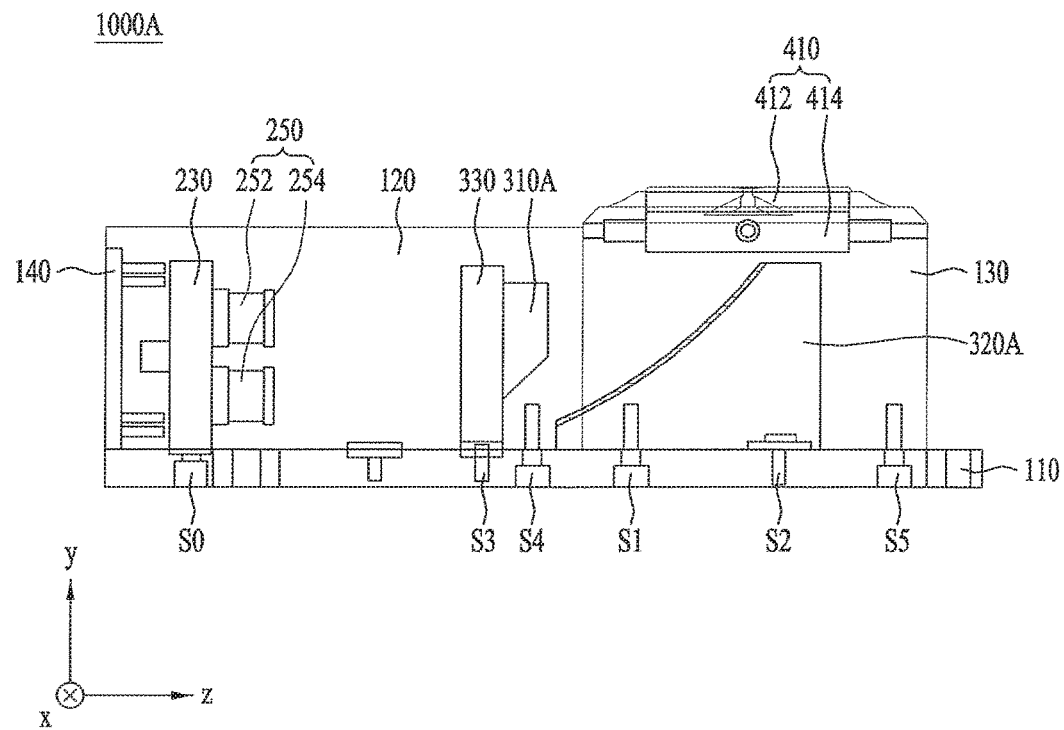
FIG. 5 is an assembled front view of the light emitting apparatus shown in FIG. 3.

An embodiment 1000A of the light emitting apparatus 1000 shown in FIG. 1 are illustrated in FIG. 3 to FIG. 24F. However, embodiments are not limited thereto. In the following description, a front surface of the light emitting apparatus 1000A may be a surface visible from the negative x-axis direction. In FIG. 3, FIG. 4, and FIG. 5, a housing 100 may be illustrated as being transparent for easy understanding of a state in which a light source device 200A, a light transmission device 300A, and a wavelength conversion device 400A are provided in the housing 100.

Referring to FIG. 3 to FIG. 7, the light emitting apparatus 1000A may include a housing 100, a light source device 200A, a light transmission device 300A, and a wavelength conversion device 400A. The light source device 200A, a light transmission device 300A, and a wavelength conversion device 400A may be embodiments of the light source device 200, the light transmission device 300, and the wavelength conversion device 400 shown in FIG. 1, respectively, and therefore, a duplicate description thereof has been omitted.

The light source device 200A may include a plurality of light sources 210A, a plurality of collimation lenses 220, a light source base 230, a barrel device 240, a lens holder device 250, and a retainer device 260. The light sources 210A may emit a plurality of laser beams. The light sources 210A may include first and second laser light sources 212 and 214. The first and second laser light sources 212 and 214 may respectively correspond to the first and second laser light sources 212 and 214 shown in FIG. 1. The first and second laser light sources 212 and 214 may respectively emit first and second laser beams.

The light emitting apparatus 1000A shown in FIG. 3 to FIG. 7 may be described as including the first and second laser light sources 212 and 214 arranged to be vertically connected to the light path conversion device 310A shown in FIG. 2A. However, embodiments are not limited thereto. In another embodiment, the light emitting apparatus 1000A shown in FIG. 3 to FIG. 7 may include the first and second laser light sources 212 and 214 arranged to be horizontally connected to the light path conversion device 310B shown in FIG. 2B. In a further embodiment, the light emitting apparatus 1000A shown in FIG. 3 to FIG. 7 may include the first and second laser light sources 212 and 214 that intersect each other to be connected to the light path conversion device 310C shown in FIG. 2C.

If an arrangement of the first and second laser light sources 212 and 214 is changed from the vertical arrangement to the horizontal arrangement or the intersecting arrangement, an internal construction of the light transmission device 300A may be changed, and components of the collimation lenses 220, the barrel device 240, the lens holder device 250, and the retainer device 260 may be provided in the light source device 200A so as to correspond to the horizontal arrangement or the intersecting arrangement. The following description may also be applied in the case in which the laser light sources are arranged horizontally or intersect each other.

The collimation lenses 220 may include first and second collimation lenses 222 and 224. The first collimation lens 222 may perform a same function as the first collimation lens 222 shown in FIG. 1. The second collimation lens 224 may perform a same function as the second collimation lens 224 shown in FIG. 1.

The light source base 230 may fix and support each of the first and second laser light sources 212 and 214. The first and second laser light sources 212 and 214 may respectively emit polarized laser beams. Polarization directions of the laser beams may be changed depending on directions in which the first and second laser light sources 212 and 214 emit the beams. If the first and second laser light sources 212 and 214 are turned 90 degrees, the polarization directions of the laser beams may be changed 90 degrees. Since the arrangement of the first and second laser light sources 212 and 214 is critical, the light source base 230 may fix and support the first and second laser light sources 212 and 214, thereby preventing the polarization directions of the laser beams from being changed.

Figure 8C:
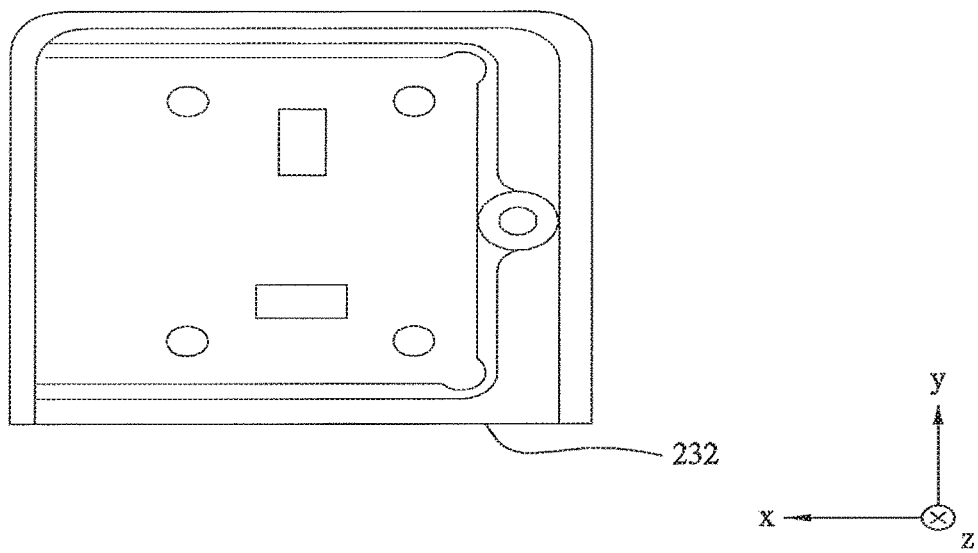
Figure 8D:
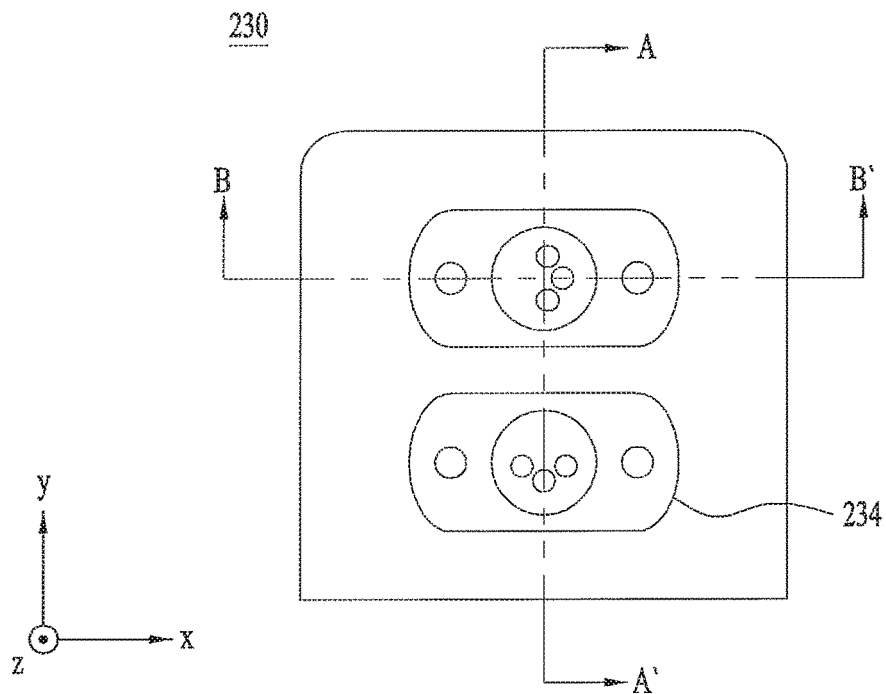
Figure 8E:
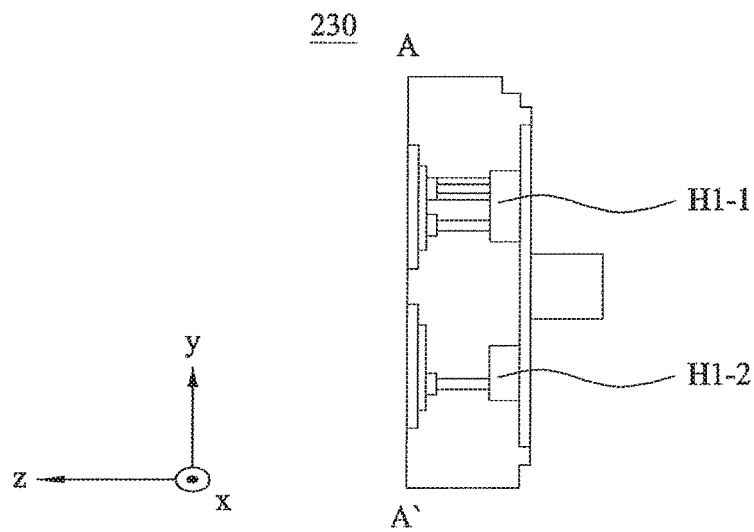
Figure 8F:
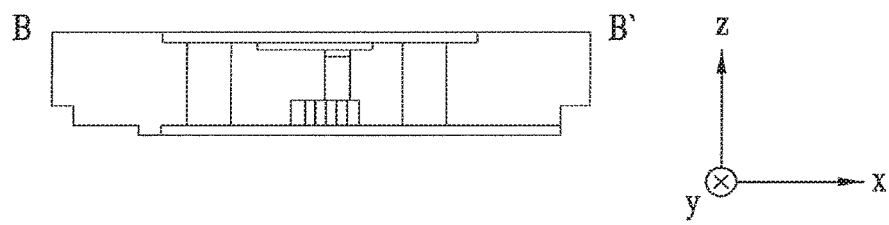
Figure 8G:
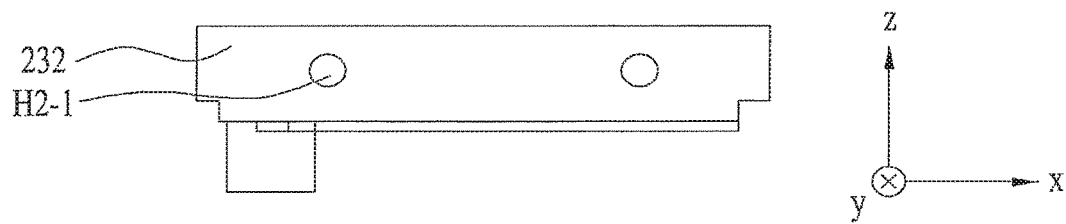
Figure 8H:
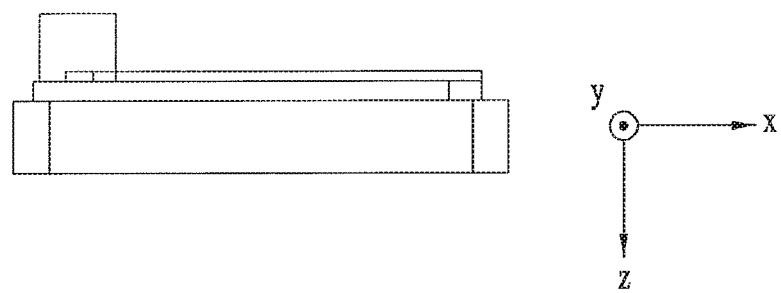
Figure 8I:
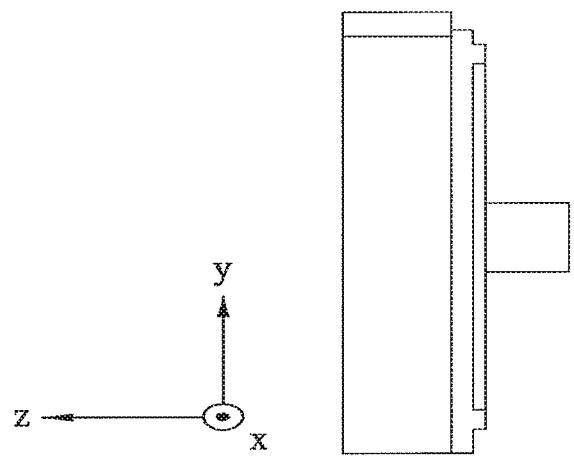

FIG. 8A to FIG. 8I are views showing various shapes of the light source base 230. FIG. 8A is a left perspective view of the light source base 230, FIG. 8B is a right perspective view of the light source base 230, FIG. 8C is a left side view of the light source base 230, FIG. 8D is a right side view of the light source base 230, FIG. 8E is a sectional view taken along ling A-A' of the light source base 230 shown in FIG. 8D, FIG. 8F is a sectional view taken along ling B-B' of the light source base 230 shown in FIG. 8D, FIG. 8G is a bottom view of the light source base 230, FIG. 8H is a plan view of the light source base 230, and FIG. 8I is a rear view of the light source base 230.

Referring to FIG. 8A to FIG. 8I, the first and second laser light sources 212 and 214 may be inserted into first and second light sources holes H1-1 and H1-2 formed in the light source base 230 such that the first and second laser light sources 212 and 214 may be fixed and supported by the light source base 230. The light source base 230 may dissipate heat generated from the first and second laser light sources 212 and 214. The light source base 230 may be made of a material exhibiting high thermal conductivity, such as aluminum, copper, brass, gold, and silver.

The light source base 230 may be fastened to or engage with the housing 100, e.g., a main base 110. The light source base 230 may include a fastener 232 provided in the part with which the main base 110 engages. The fastener 232 of the light source base 230 may include a thermal pad or thermal compound exhibiting high thermal conductivity. If the fastener 232 of the light source base 230 includes a heat dissipation material, heat generated from the first and second laser light sources 212 and 214 may be dissipated through the housing 100 via the light source base 230. However, embodiments are not limited thereto. In other embodiments, the fastener may be provided at the portion of the main base 110 that contacts the light source base 230, rather than at the light source base 230.

Figure 21A:
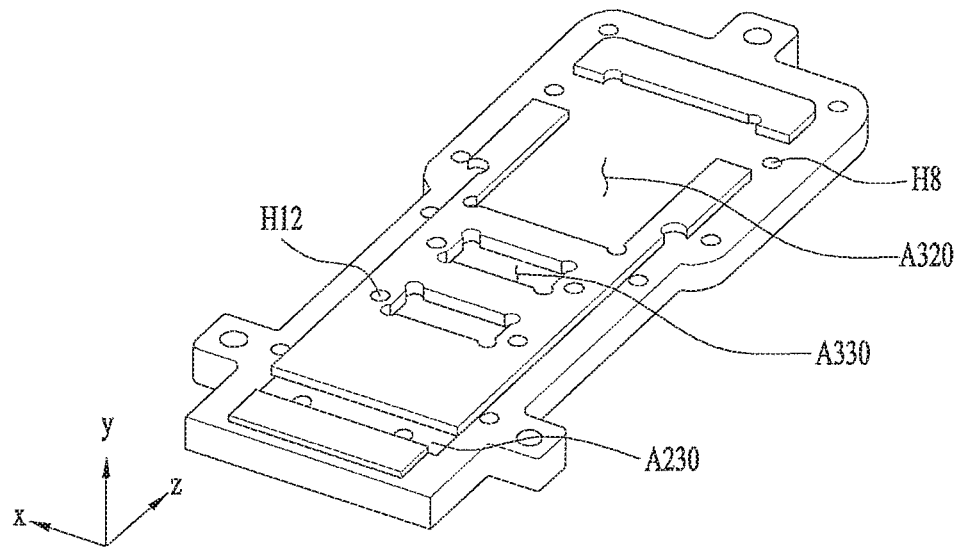
FIG. 21A to FIG. 21H are views showing various shapes of a main base.
Figure 21B:
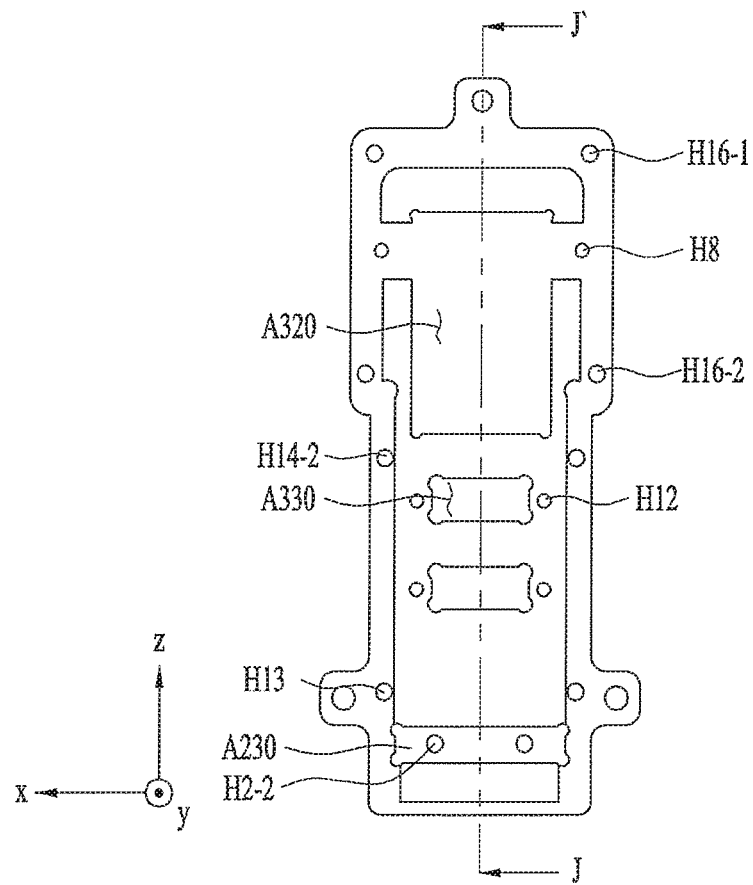

In order to fasten the light source base 230 and the main base 110, the light source base 230 may include a hole H2-1 as shown in FIG. 8G, and the main base 110 may include a hole H2-2 as shown in FIG. 21B. A screw S0 may be inserted through the holes H2-1 and H2-2, as shown in FIG. 5, such that the light source base 230 and the main base 110 may be fastened to each other. The barrel device 240 may include first and second barrels 242 and 244. The first collimation lens 222 may be fastened to the first barrel 242, and the second collimation lens 224 may be fastened to the second barrel 244. The barrel device 240 may be fastened to the lens holder device 250.

Figure 6A:
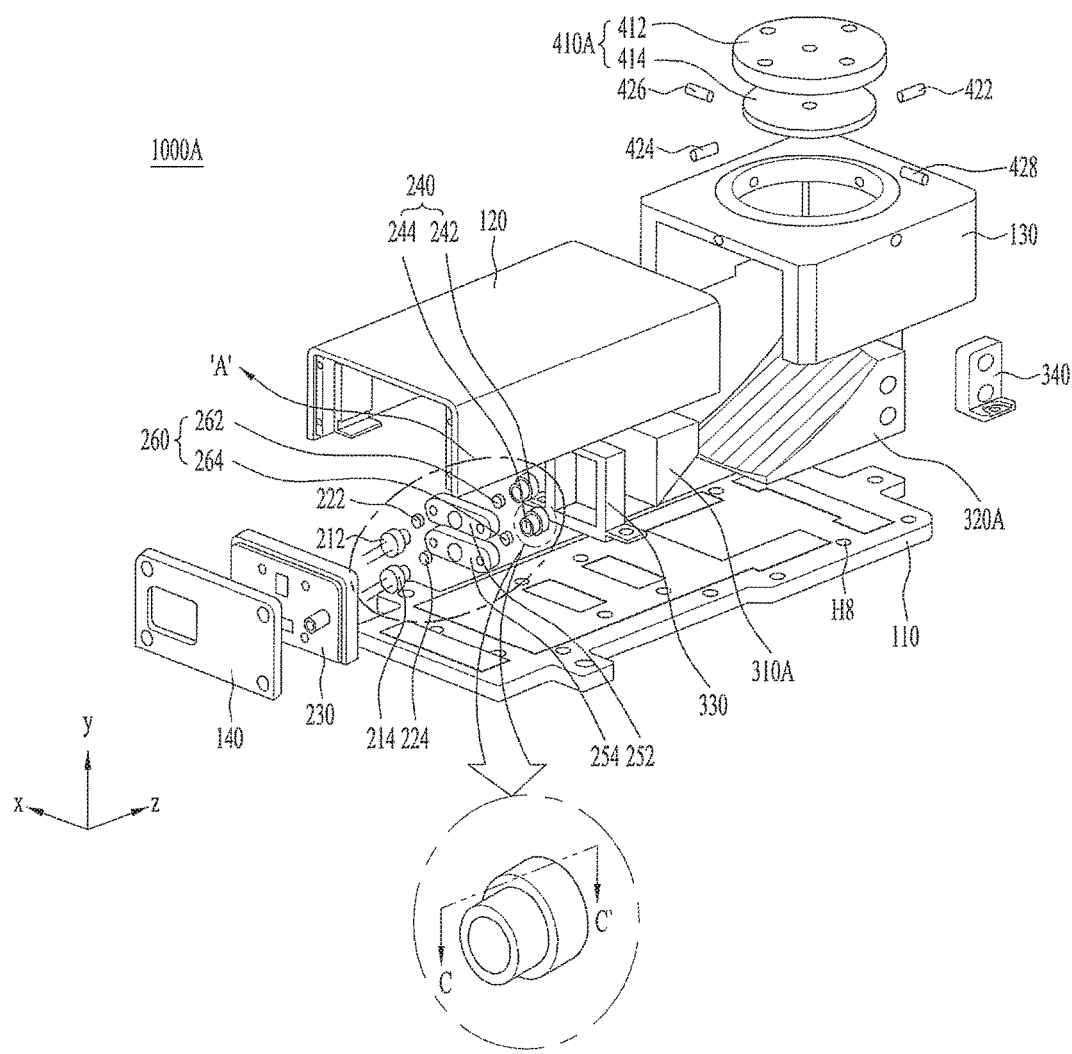
FIG. 6A is an upper exploded perspective view of the light emitting apparatus shown in FIG. 3.
Figure 9A:
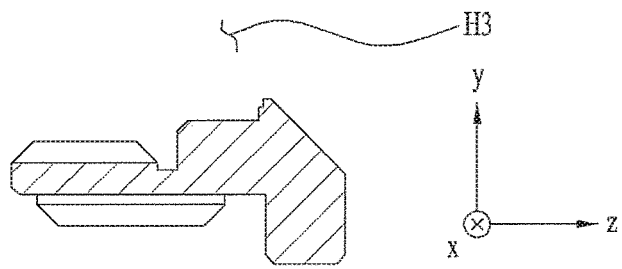
FIG. 9A to FIG. 9C are views showing various shapes of each of first and second barrels.
Figure 9B:
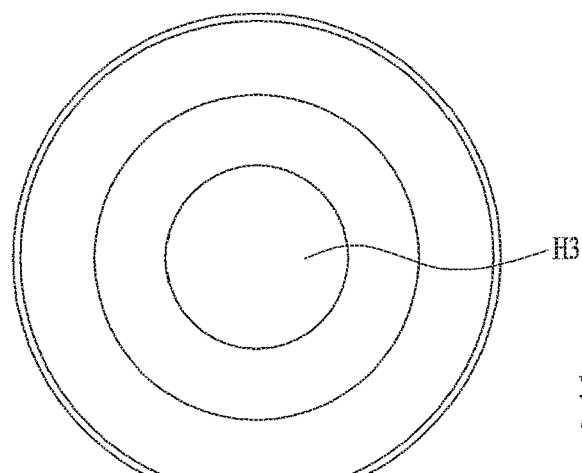
Figure 9C:
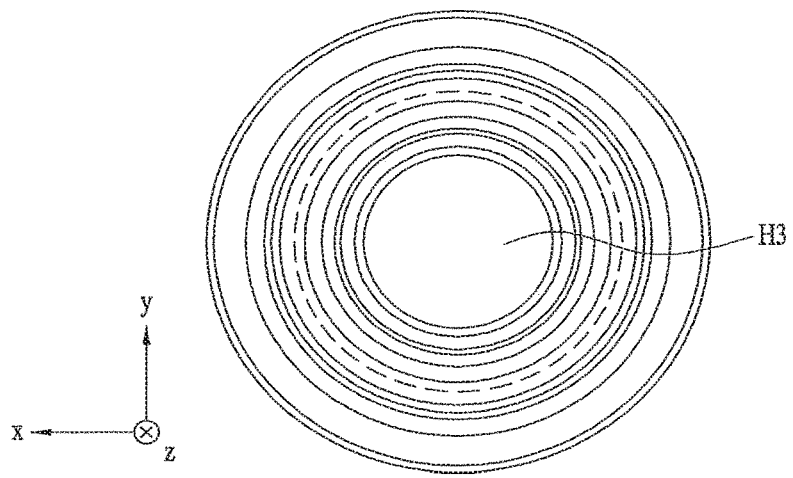

FIG. 9A to FIG. 9C are views showing various shapes of each of the first and second barrels 242 and 244. The first and second barrels 242 and 244 may have a same shape. FIG. 9A is a sectional view taken along line C-C', in a y-axis direction, of the second barrel 244 shown in FIG. 6A, FIG. 9B is a right side view of each of the first and second barrels 242 and 244, and FIG. 9C is a left side view of each of the first and second barrels 242 and 244.

Referring to FIG. 9A to FIG. 9C, the first collimation lens 222 and the second collimation lens 224 may be fastened into holes H3 formed in the first and second barrels 242 and 244. The lens holder device 250 may include first and second lens holders 252 and 254. The first lens holder 252 may align the first barrel 242 with the first laser light source 212, and the second lens holder 254 may align the second barrel 244 with the second laser light source 214.

If the first and second collimation lenses 222 and 224 are not aligned with the first and second beams emitted from the first and second laser light sources 212 and 214, respectively, the first and second collimation lenses 222 and 224 may not output collimated beams, and the beams may be incident on the reflection device 320A, which focuses beams that are incident thereon at an angle of 0 degrees on the focal point, at incorrect angles. As a result, the beams reflected by the reflection device 320A may be difficult to focus on the focal point F. Even if the beams reflected by the reflection device 320A are focused on the focal point F, the size of the beams may be increased. In order to solve these problems, the lens holder device 250 may align the light sources 210A with the barrel device 240.

The first lens holder 252 may tightly push the first laser light source 212 against the light source base 230 so that the first laser light source 212 sticks to the light source base 230. The second lens holder 254 may tightly push the second laser light source 214 against the light source base 230 so that the second laser light source 214 sticks to the light source base 230. If first and second lens holders 252 and 254 do not push the first and second laser light sources 212 and 214, respectively, heat generated from the first and second laser light sources 212 and 214 may not be sufficiently dissipated. Efficiency of the first and second laser light sources 212 and 214 may be reduced and the first and second laser light sources 212 and 214 may be damaged. In order to solve these problems, the lens holder device 250 may push the light sources 210A.

Figure 10A:
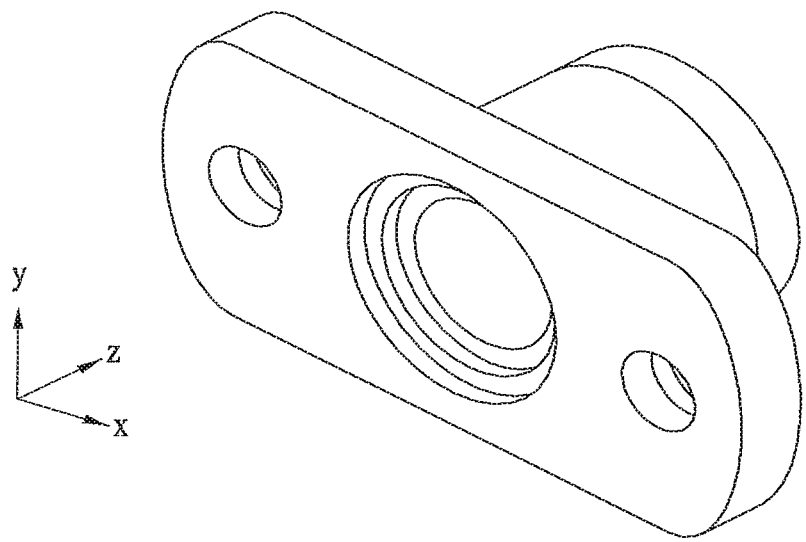
FIG. 10A to FIG. 10F are views showing various shapes of each of first and second lens holders.
Figure 10B:
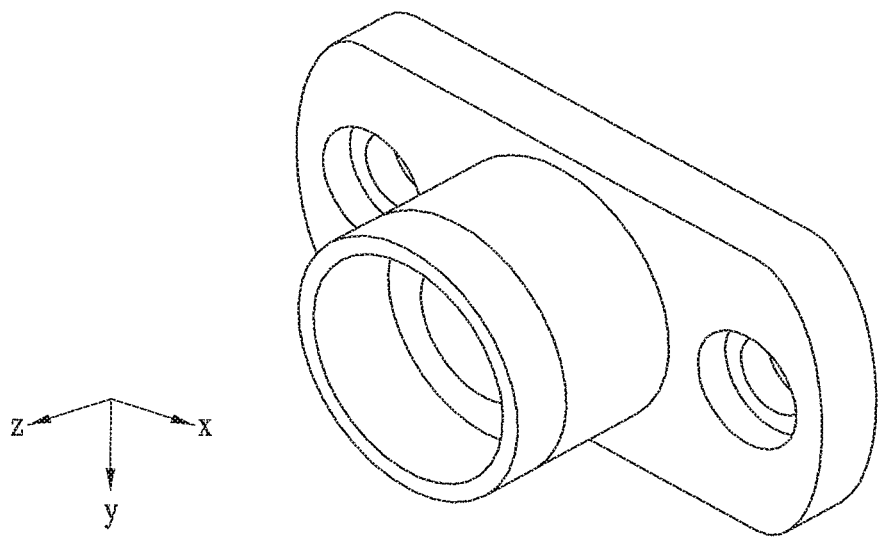
Figure 10C:
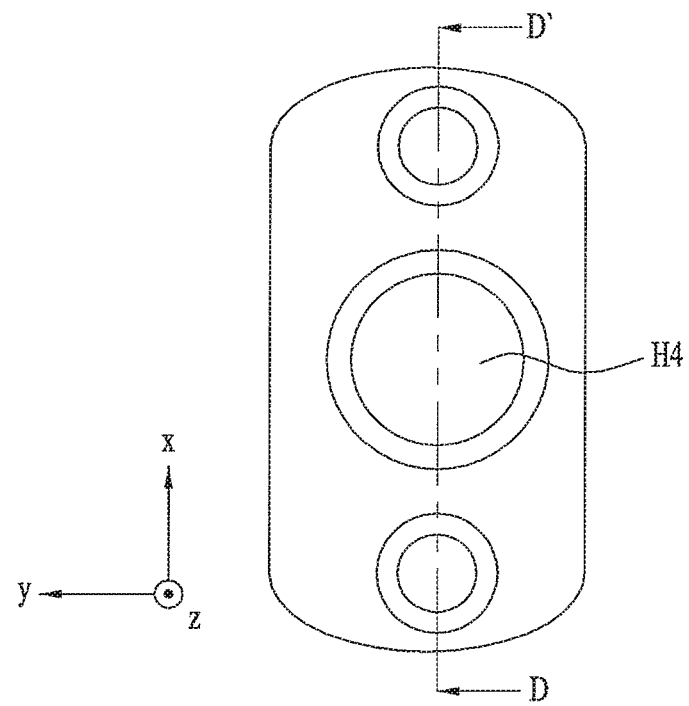
Figure 10D:
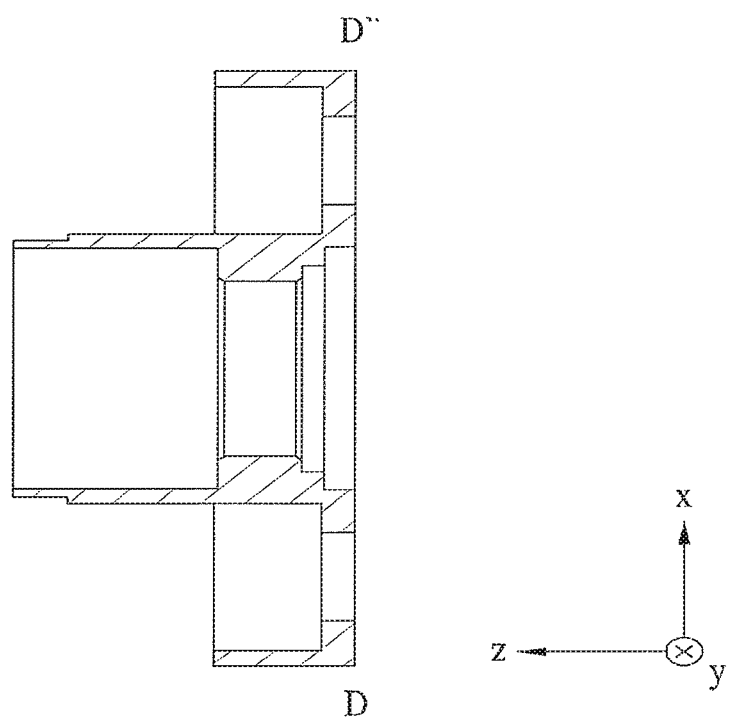
Figure 10E:
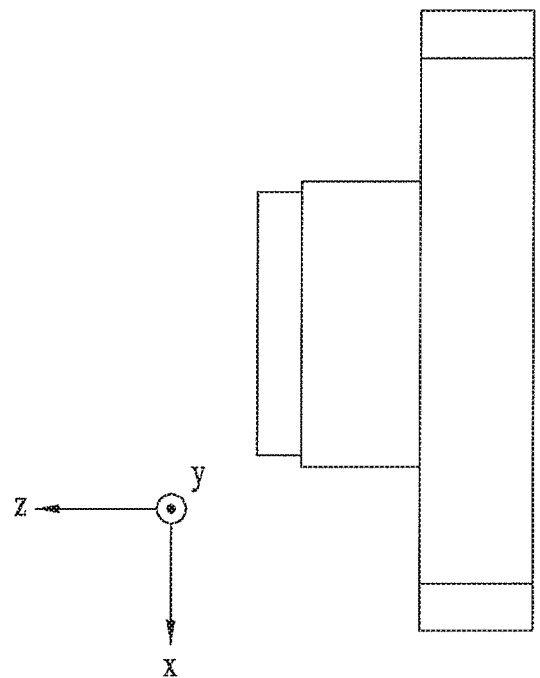
Figure 10F:
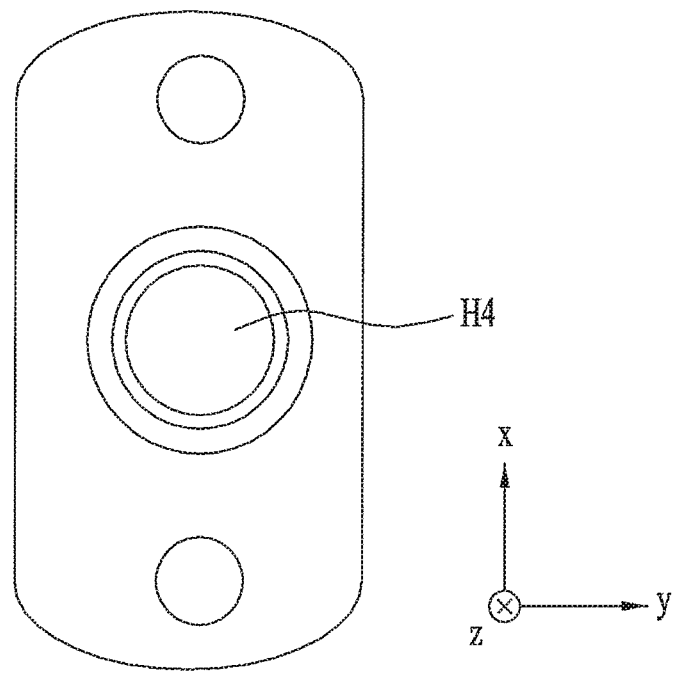

FIG. 10A to FIG. 10F are views showing various shapes of each of the first and second lens holders 252 and 254. The first and second lens holders 252 and 254 may have a same shape. FIG. 10A is a left upper perspective view of each of the first and second lens holders 252 and 254, FIG. 10B is a right upper perspective view of each of the first and second lens holders 252 and 254, FIG. 10C is a right side view of each of the first and second lens holders 252 and 254, FIG. 10D is a sectional view taken along line D-D' of each of the first and second lens holders 252 and 254 shown in FIG. 10C, FIG. 10E is a plan view of each of the first and second lens holders 252 and 254, and FIG. 10F is a left side view of each of the first and second lens holders 252 and 254. In FIG. 10D, the hatched surface is a cutaway surface.

Referring to FIG. 10A to FIG. 10D, the first and second barrels 242 and 244 may be respectively inserted into holes H4 formed in the first and second lens holders 252 and 254, and the first and second lens holders 252 and 254 may be inserted into recesses 234 in the light source base 230. An x-axis length of each of the recesses 234 shown in FIGS. 8B and 8D may be substantially similar to an x-axis length of each of the first and second lens holders 252 and 254 shown in FIG. 10C, and a y-axis width of each of the recesses 234 may be substantially equal to a y-axis width of each of the first and second lens holders 252 and 254 shown in FIG. 10C. Substantially equal may mean that the first and second lens holders 252 and 254 may be fitted into the recesses 234 so as to be fixed in the recesses 234. Consequently, the first and second laser light sources 212 and 214 may be tightly pushed against and stuck to the light source base 230 by the first and second lens holders 252 and 254.

The retainer device 260 of the light source device 200A may include first and second retainers 262 and 264. The first retainer 262 may fix the first collimation lens 222 fastened to the first barrel 242, and the second retainer 264 may fix the second collimation lens 224 fastened to the second barrel 244.

Figure 6B:
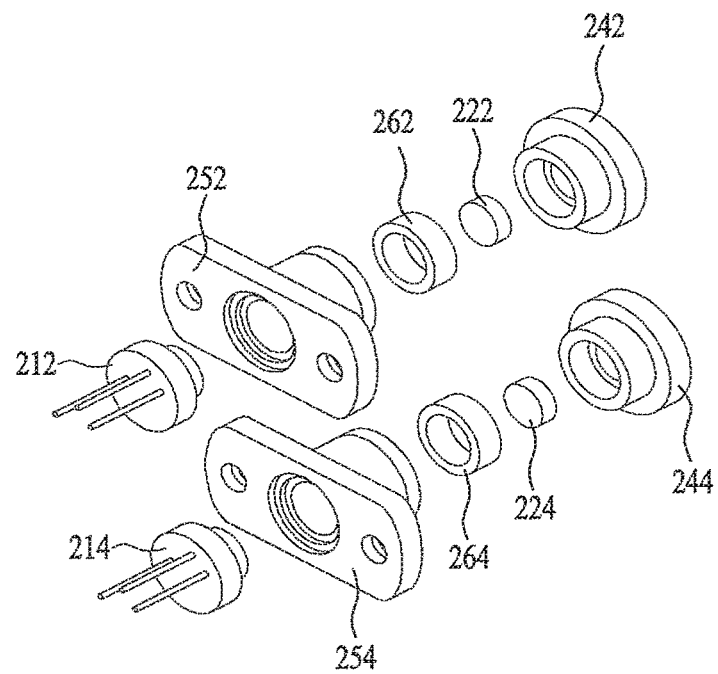
FIG. 6B and FIG. 6C are respectively an exploded perspective view and an assembled perspective view showing part 'A' in FIG. 6A.
Figure 6C:
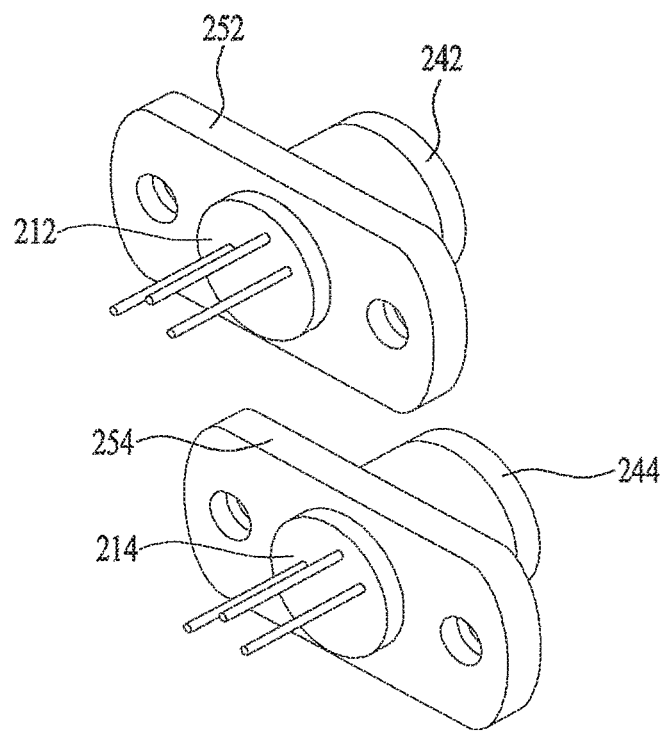

In FIG. 6A, the first and second collimation lenses 222 and 224 are shown as being respectively provided between the first and second laser light sources 212 and 214 and the first and second lens holders 252 and 254. In FIG. 6B, however, the first and second collimation lenses 222 and 224 are shown as being provided between the retainer device 260 and the barrel device 240 for ease of understanding.

Figure 11A:
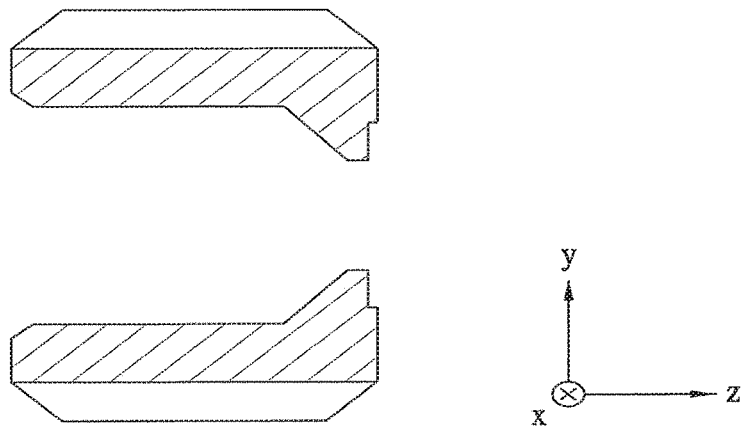
FIG. 11A to FIG. 11C are views showing various shapes of each of first and second retainers.
Figure 11B:
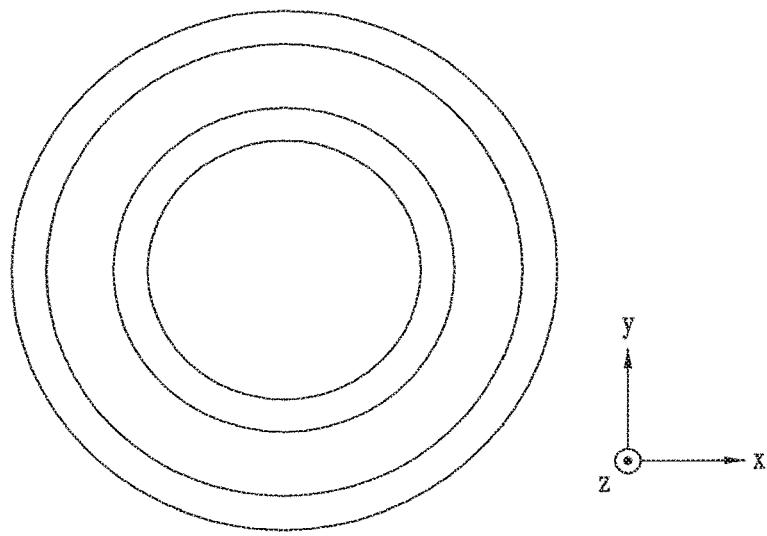
Figure 11C:
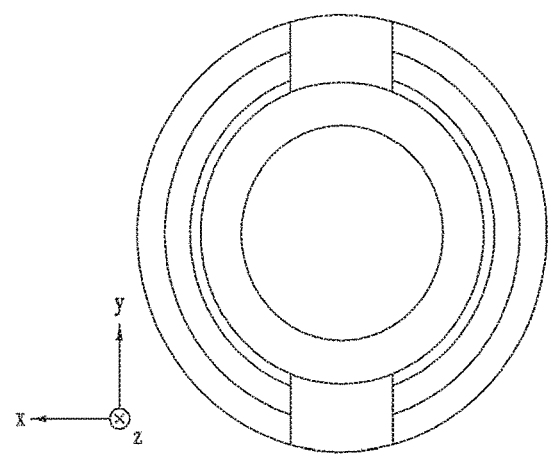

FIG. 11A to FIG. 11C are views showing various shapes of each of the first and second retainers 262 and 264. The first and second retainers 262 and 264 may have a same shape. FIG. 11A is a sectional view of each of the first and second retainers 262 and 264 when cut in the y-axis direction, FIG. 11B is a right side view of each of the first and second retainers 262 and 264 shown in FIG. 11A, and FIG. 11C is a left side view of each of the first and second retainers 262 and 264 shown in FIG. 11A.

Figure 12:
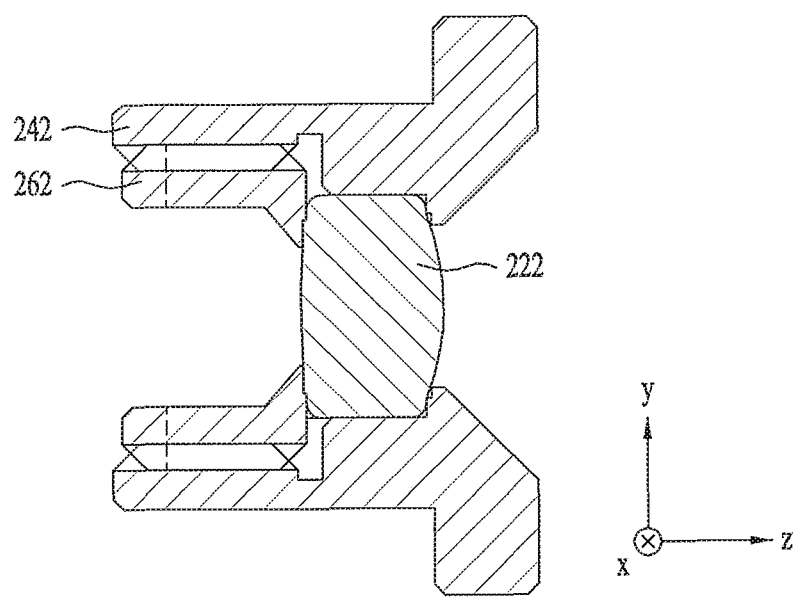
FIG. 12 is a cutaway sectional view showing the state in which the first retainer, the first barrel, and a first collimation lens are coupled to each other.

FIG. 12 is a cutaway sectional view showing a state in which the first retainer 262, the first barrel 242, and the first collimation lens 222 may be coupled to each other. FIG. 12 shows the state in which the first barrel 242 shown in FIG. 9A, the first retainer 262 shown in FIG. 11A, and the first collimation lens 222 shown in FIGS. 6A, 6B, and 7 may be coupled to each other. The second retainer 264, the second barrel 244, and the second collimation lens 224 may be coupled to each other in a same manner as shown in FIG. 12.

Referring to FIG. 11A to FIG. 11C and FIG. 12, the first retainer 262 may be provided between the first collimation lens 222 fastened in the third hole H3 and the inner surface of the first barrel 242 in order to fix the first collimation lens 222. The second retainer 264 may be provided between the second collimation lens 224 fastened in the third hole H3 and the inner surface of the second barrel 244 in order to fix the second collimation lens 224. According to this embodiment, the retainer device 260 may be omitted from the light source device 200A.

Referring back to FIG. 3 to FIG. 7, the light transmission device 300A may include a light path conversion device 310A, a reflection device 320A, a path holder 330, and a reflection holder 340. The light path conversion device 310A and the reflection device 320A may perform a same function as the light path conversion device 310 and the reflection device 320 shown in FIG. 1, respectively. The light path conversion device 310A may gather a plurality of laser beams into a single beam, and the reflection device 320A may output the single beam to the focal point. The reflection device 320A may be located only in the region on which the single beam in incident.

Since the first and second laser light sources 212 and 214 shown in FIG. 3 to FIG. 7 are arranged vertically, the light path conversion device 310A may be configured as shown in FIG. 2A. As described with reference to FIG. 2A to FIG. 2C, the light path conversion device 310 may have various shapes depending on a direction in which the first and second laser light sources 212 and 214 are arranged. In consideration thereof, a description may be given of the construction of the light path conversion device 310 depending on the direction in which the first and second laser light sources 212 and 214 are arranged in the light emitting apparatus 1000A shown in FIG. 3 to FIG. 7.

Figure 13A:
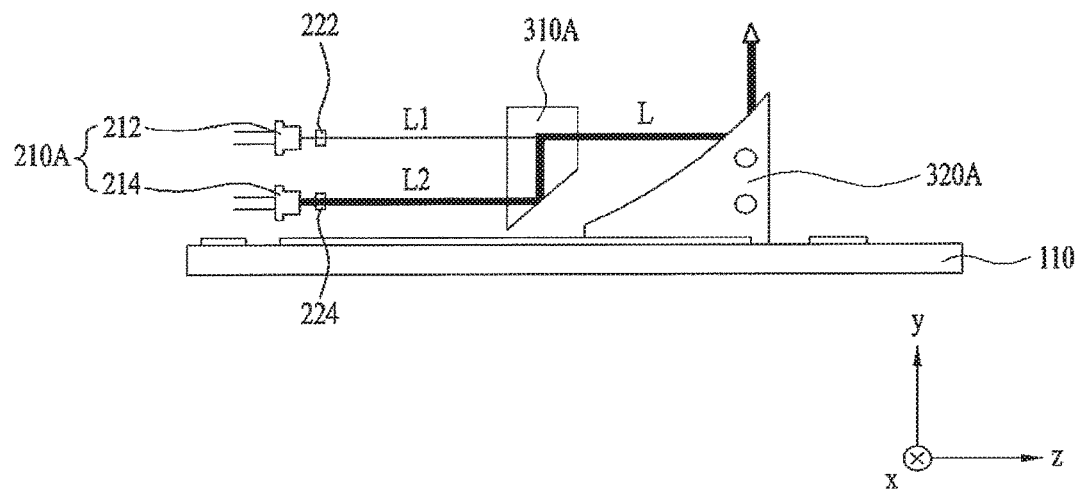
FIG. 13A and FIG. 13B are respectively a sectional view and a plan view showing an embodiment of the light path conversion device.
Figure 13B:
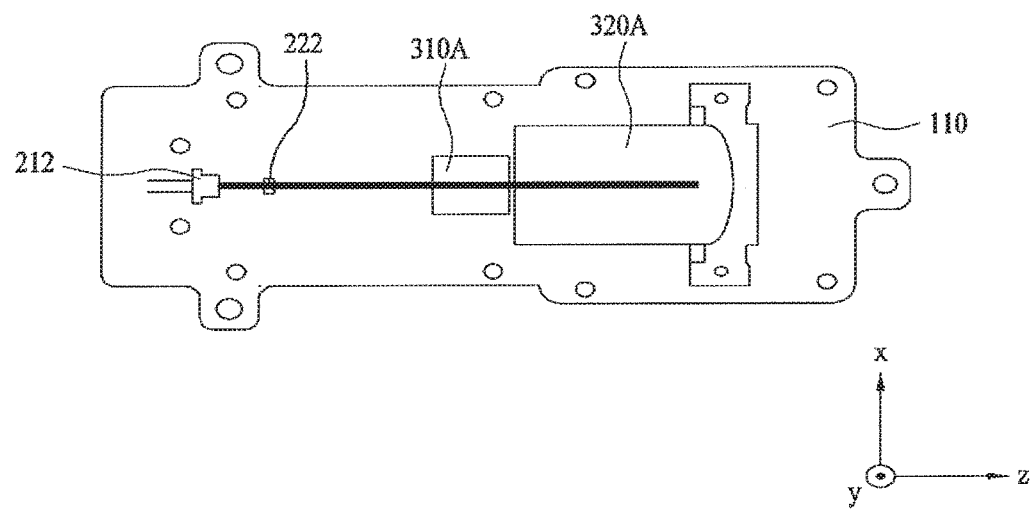
Figure 14A:
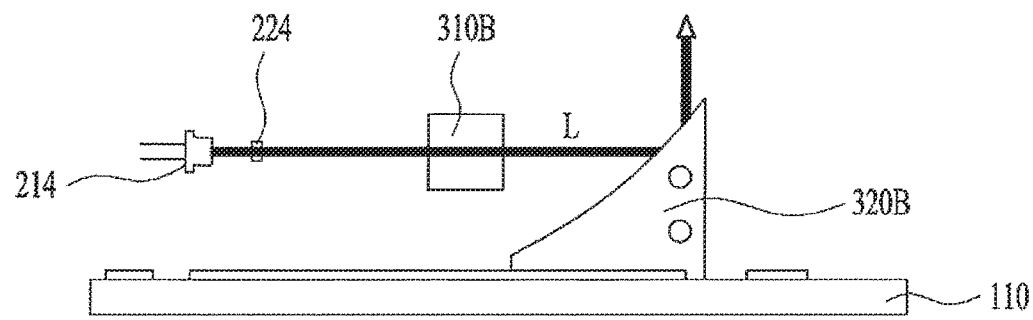
FIG. 14A and FIG. 14B are respectively a sectional view and a plan view showing another embodiment of the light path conversion device.
Figure 14B:
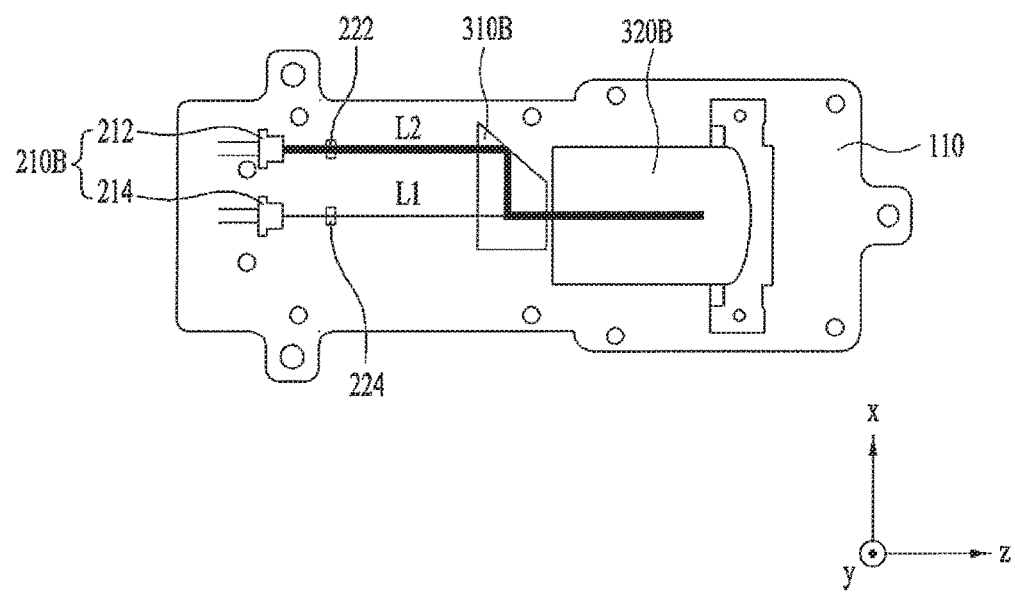
Figure 15A:
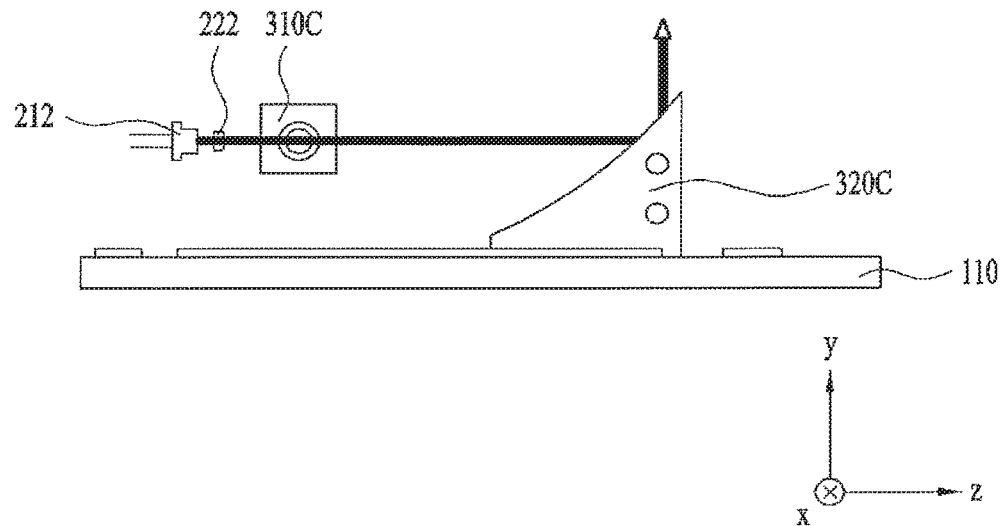
FIG. 15A and FIG. 15B are respectively a sectional view and a plan view showing a further embodiment of the light path conversion device.
Figure 15B:
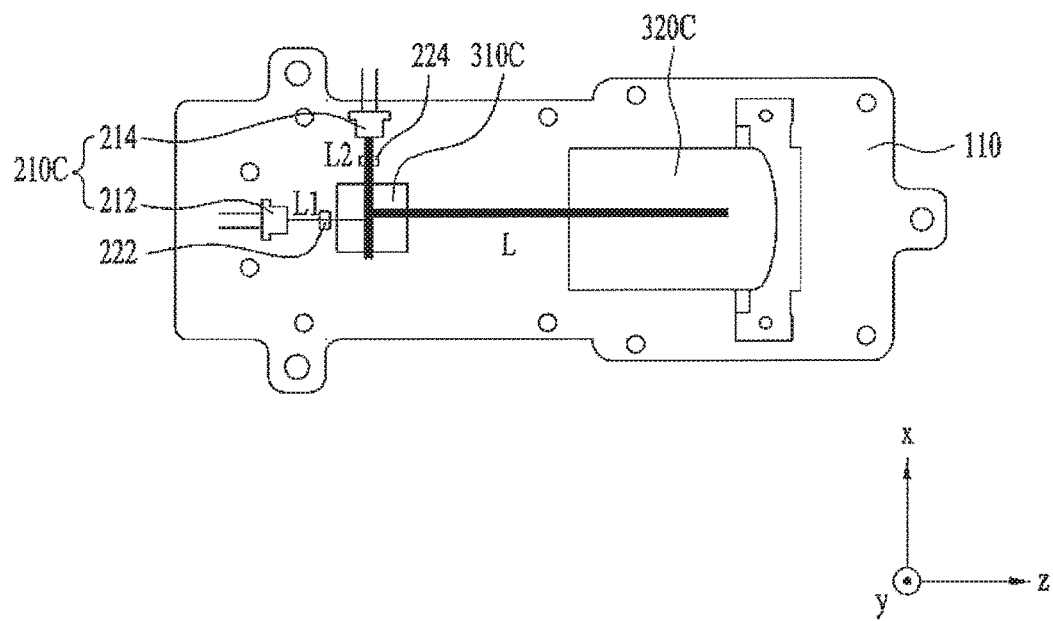

FIG. 13A and FIG. 13B are respectively a sectional view and a plan view showing an embodiment 310A of the light path conversion device 310, FIG. 14A and FIG. 14B are respectively a sectional view and a plan view showing another embodiment 310B of the light path conversion device 310, and FIG. 15A and FIG. 15B are respectively a sectional view and a plan view showing a further embodiment 310C of the light path conversion device 310. In FIG. 13A to FIG. 15B, only a main base 110, a plurality of light sources 210A, 210B, and 210C, a light path conversion device 310A, 310B, and 310C, and a reflection device 320 may be shown for ease of understanding.

The light path conversion device 310A shown in each of FIG. 13A and FIG. 13B may correspond to the light path conversion device 310A shown in FIG. 2A, the light path conversion device 310B shown in each of FIG. 14A and FIG. 14B may correspond to the light path conversion device 310B shown in FIG. 2B, and the light path conversion device 310C shown in each of FIG. 15A and FIG. 15B may correspond to the light path conversion device 310C shown in FIG. 2C.

If the first and second laser light sources 212 and 214 are arranged vertically or horizontally, for example, if the first and second laser light sources 212 and 214 are arranged in the y-axis direction or the x-axis direction, the light path conversion device 310A and 310B may include a prism and a light transmission and reflection device, as shown in FIG. 13A, FIG. 13B, FIG. 14A, and FIG. 14B.

If the first and second laser light sources 212 and 214 are arranged vertically, as shown in FIG. 13A and FIG. 13B, the prism 314 of the light path conversion device 310A may reflect the second beam L2, incident thereon in the direction parallel to the first direction, in which the first beam L1 was incident, in the second direction. The light transmission and reflection device 312 may transmit the first beam L1 in the first direction and reflect the second beam L2, which has been reflected in the second direction by the prism 314, in the first direction. As a result, a single beam L may be output to the reflection device 320A.

If the first and second laser light sources 212 and 214 are arranged horizontally, as shown in FIG. 14A and FIG. 14B, the prism 314 of the light path conversion device 310B may reflect the second beam L2, incident thereon in the direction parallel to the first direction in which the first beam L1 was incident, in the third direction, which may be perpendicular to the first and second directions. The light transmission and reflection device 312 may transmit the first beam L1 in the first direction and reflect the second beam L2, which has been reflected in the third direction by the prism 314, in the first direction. As a result, a single beam L may be output to the reflection device 320B.

If the first and second laser light sources 212 and 214 intersect each other, as shown in FIG. 15A and FIG. 15B, the light path conversion device 310C may include only a light transmission and reflection device. The light transmission and reflection device 310C may transmit the first beam L1 in the first direction and reflect the second beam L2, which was incident in the third direction, in the first direction. As a result, a single beam L may be output to the reflection device 320C.

The path holder 330 may fix the light path conversion device 310A and 310C. The path holder 330 and the light path conversion device 310A and 310C may be coupled to each other using a bonding agent such as a UV hardener or a thermal hardener.

Figure 16A:
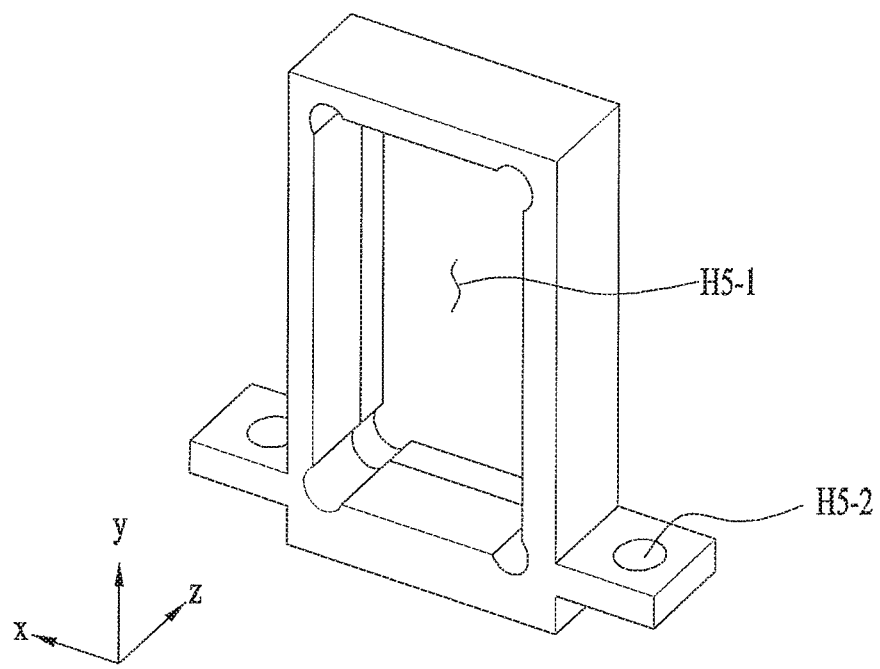
FIG. 16A to FIG. 16F are views showing various shapes of a path holder.
Figure 16B:
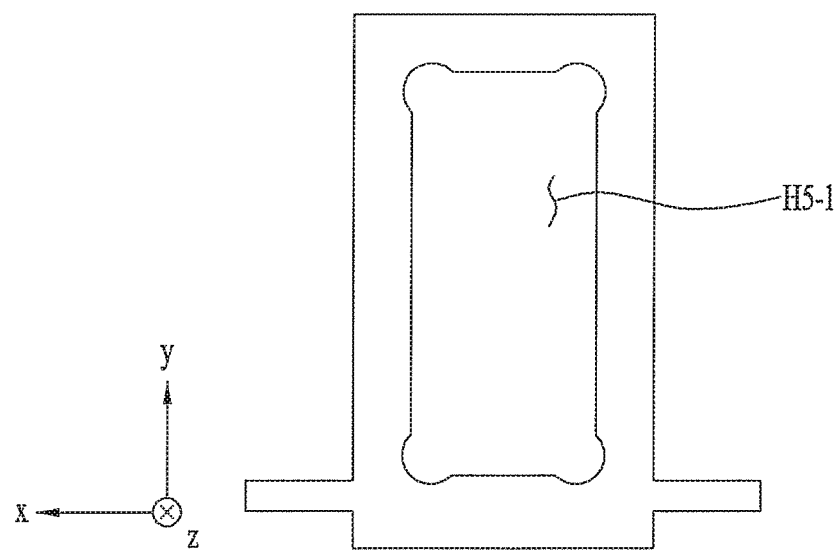
Figure 16C:
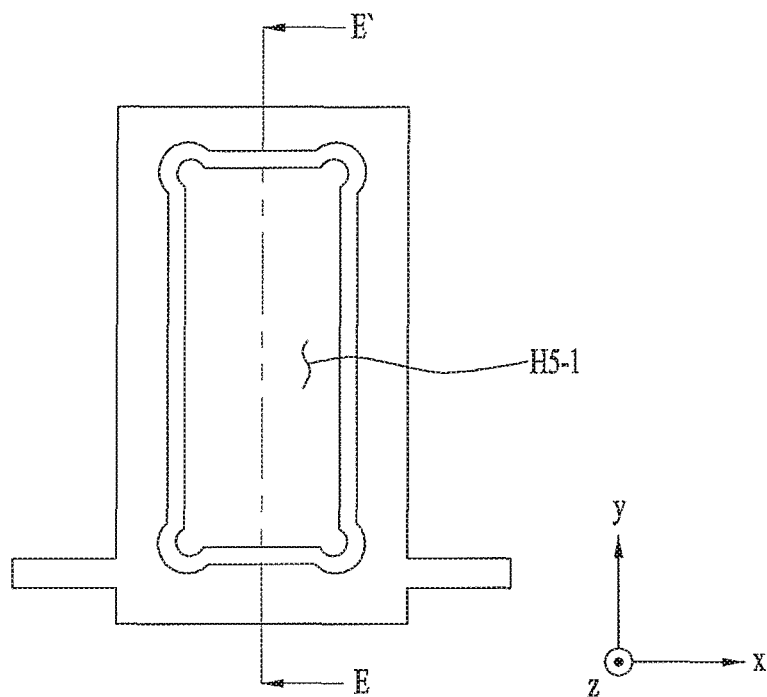
Figure 16D:
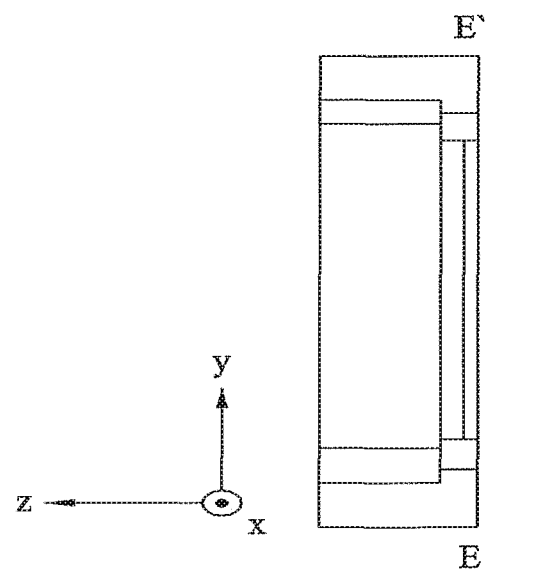
Figure 16E:
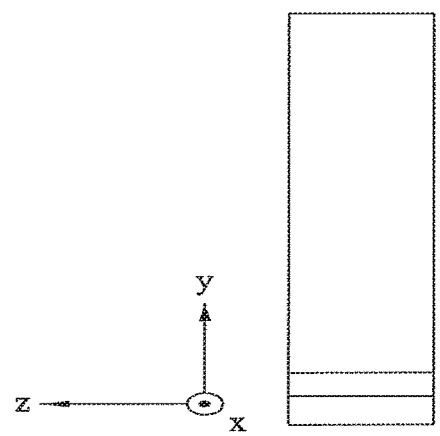
Figure 16F:
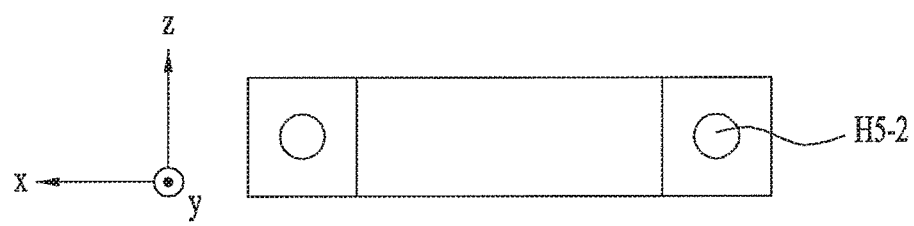

FIG. 16A to FIG. 16F are views showing various shapes of the path holder 330. FIG. 16A is an upper perspective view of the path holder 330, FIG. 16B is a left side view of the path holder 330, FIG. 16C is a right side view of the path holder 330, FIG. 16D is a sectional view taken along line E-E' of the path holder 330 shown in FIG. 16C, FIG. 16E is a rear view of the path holder 330, and FIG. 16F is a plan view of the path holder 330.

Referring to FIG. 16A to FIG. 16F, the light path conversion device 310A may be inserted into a hole H5-1 formed in the path holder 330 such that light path conversion device 310A may be fixed by the path holder 330. If the light path conversion device 310C shown in FIG. 15A and FIG. 15B is fixed instead of the light path conversion device 310A shown in FIG. 13A and FIG. 13B, a size of the hole H5-1 may be decreased. If the first and second laser light sources 212 and 214 are arranged horizontally as shown in FIGS. 14A and 14B, the path holder 330 may be omitted. The path holder 330 may be provided in the bottom thereof with an additional hole H5-2, through which the path holder 330 may be fastened to the main base 110.

Figure 17A:
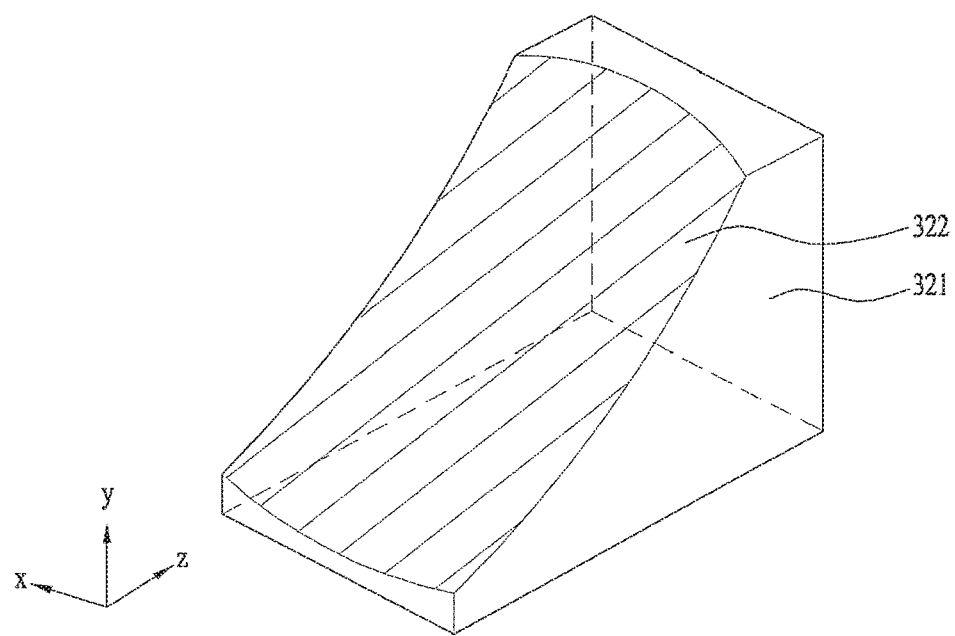
FIG. 17A to FIG. 17D are views showing various shapes of a reflection device according to an embodiment.
Figure 17B:
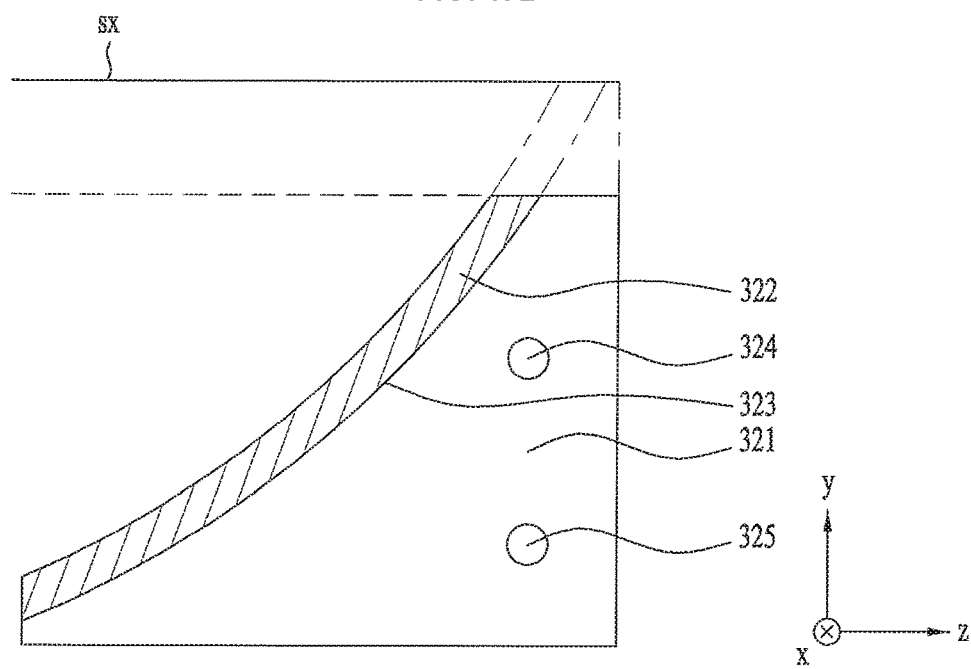
Figure 17C:
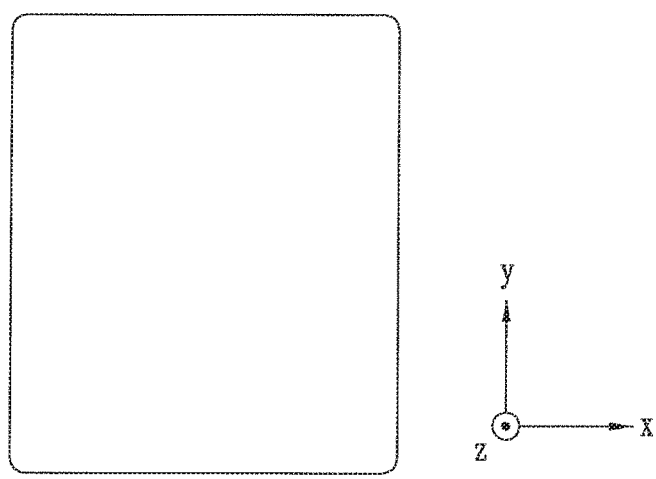
Figure 17D:
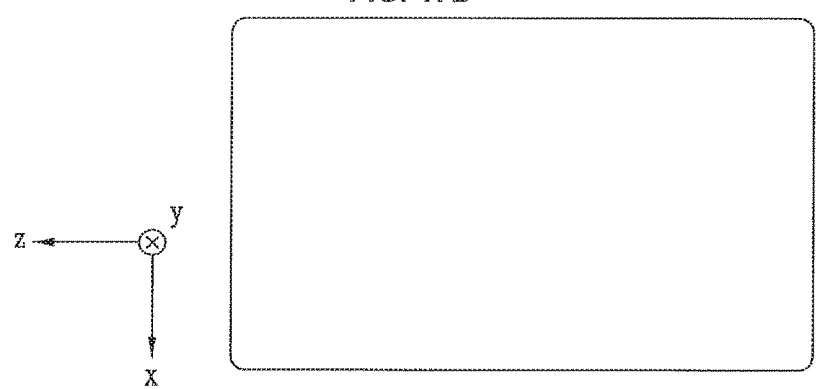

FIG. 17A to FIG. 17D are views showing various shapes of the reflection device 320A. FIG. 17A is an upper perspective view of the reflection device 320A, FIG. 17B is a front view of the reflection device 320A, FIG. 17C is a right side view of the reflection device 320A, and FIG. 17D is a bottom view of the reflection device 320A. The reflection devices 320B and 320C shown in FIG. 14A to FIG. 15B may have a same shape, as shown in FIG. 17A to FIG. 17D. In FIG. 17B, 'SX' indicates the axis of symmetry of the reflection device 320A.

Referring to FIG. 17A and FIG. 17B, the reflection device 320A may include a body 321 and a reflective layer 322. The reflective layer 322 may be provided on an inclined surface 323 of the body 321 to reflect the single beam. The reflective layer 322 may be provided on the inclined surface 323 of the body 321 as a thin film. However, embodiments are not limited thereto. If the body 321 is made of a material suitable to reflect light, the reflective layer 322 may be omitted as the inclined surface 323 of the body 321 may reflect light. For example, the body 321 may be made of aluminum. If the inclined surface 323 of the body 321 is mirror-coated, instead of providing the reflective layer 322, 90% or more of the single beam may be reflected by the reflection device 320A when the wavelength of the single beam is 400 nm to 500 nm. However, embodiments are not limited thereto.

As shown in FIG. 17B, the reflection device 320A may further include side holes 324 and 325. The reflection device 320A may be more securely coupled to the main base 110 of the housing 100 by the reflection holder 340. However, the reflection holder 340 may be omitted depending on how the reflection device 320A and the main base 110 are coupled to each other. For example, if the reflection device 320A and the main base 110 are coupled to each other using a bonding agent, the reflection holder 340 may be omitted. A screw S2 may also be omitted.

Figure 18A:
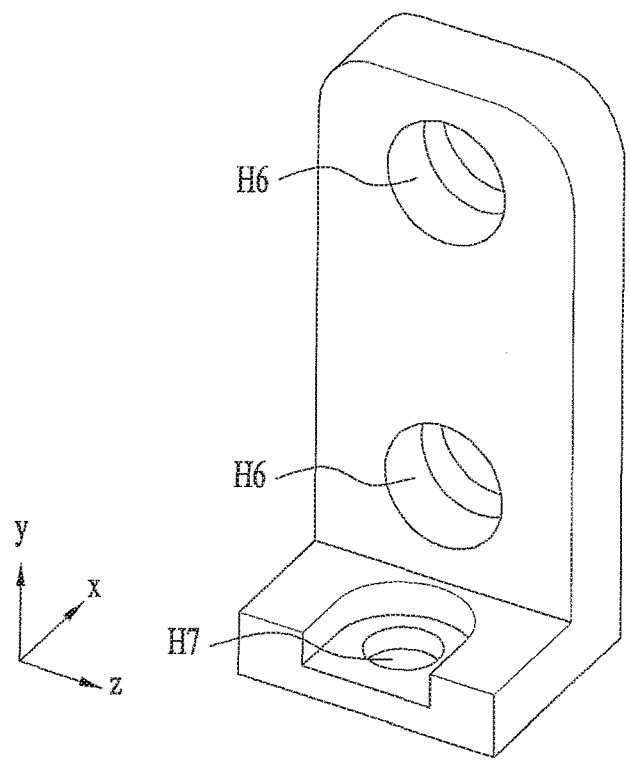
FIG. 18A to FIG. 18E are views showing various shapes of a reflection holder.
Figure 18B:
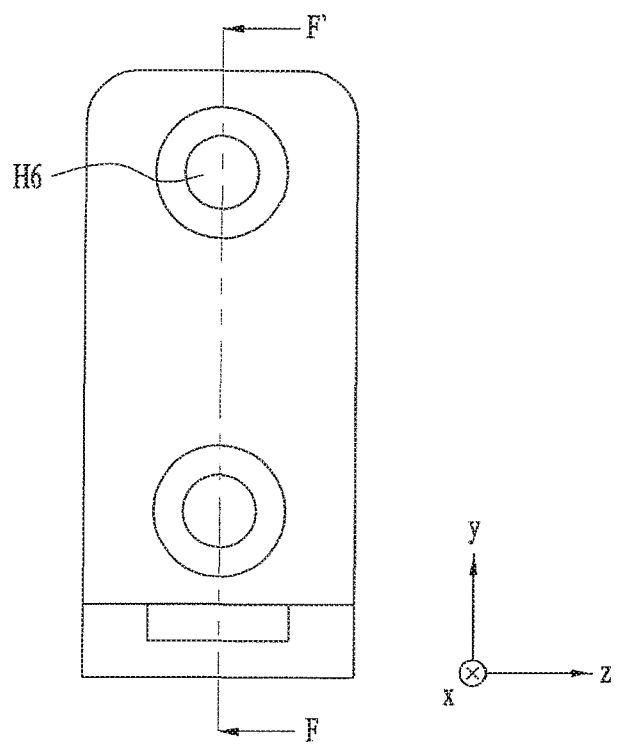
Figure 18C:
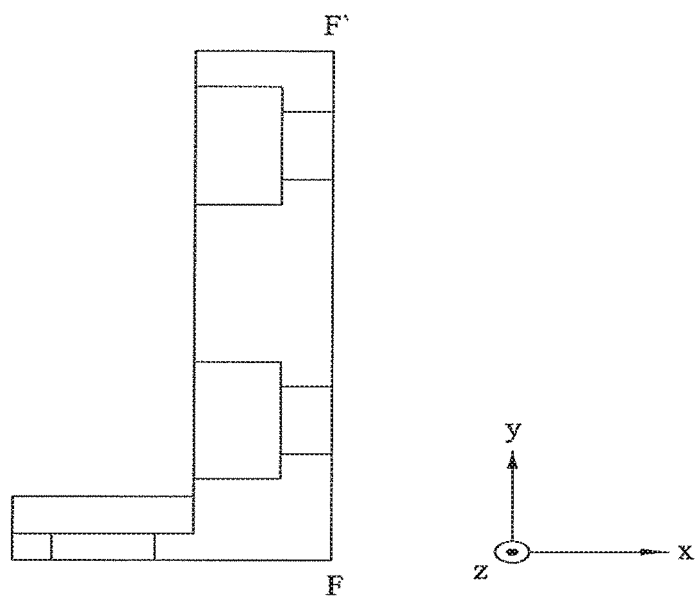
Figure 18D:
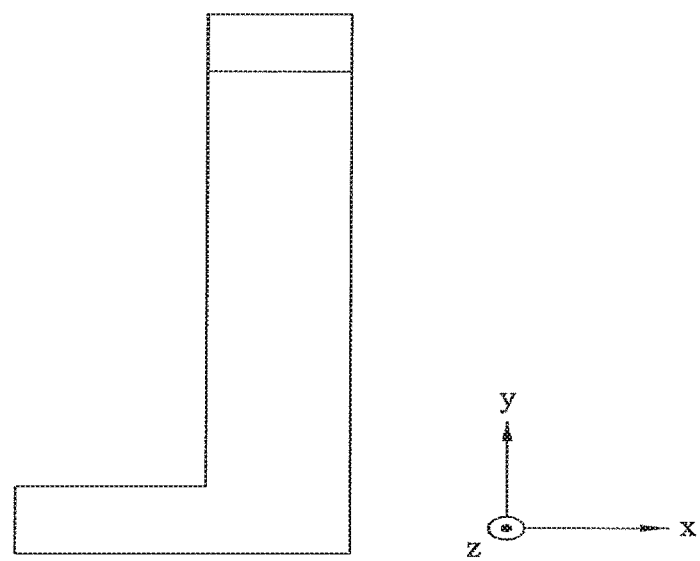
Figure 18E:
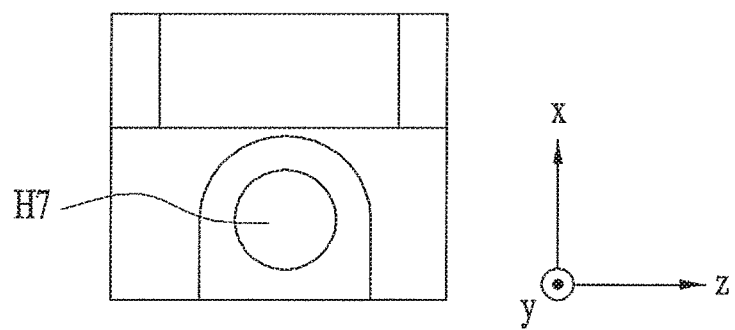

FIG. 18A to FIG. 18E are views showing various shapes of the reflection holder 340. FIG. 18A is an upper perspective view of the reflection holder 340, FIG. 18B is a front view of the reflection holder 340, FIG. 18C is a sectional view taken along line F-F' of the reflection holder 340 shown in FIG. 18B, FIG. 18D is a right side view of the reflection holder 340, and FIG. 18E is a plan view of the reflection holder 340.

Referring to FIG. 18A to FIG. 18E, the reflection holder 340 may include at least one hole H6 formed in the body thereof and at least one hole H7 formed in a bottom thereof. The body 321 of the reflection device 320A shown in FIG. 17B may include one or more side holes 324 and 325 formed in a side thereof. Screws may be inserted through the hole H6 of the reflection holder 340 and through the side holes 324 and 325 of the reflection device 320A. A screw S2 may be inserted through the hole H7 of the reflection holder 340 and into a hole H8 formed in the main base 110, as shown in FIG. 21B, whereby the reflection holder 340 may fix the reflection device 320A to the main base 110.

Referring back to FIG. 3 to FIG. 7, the wavelength conversion device 400A may include a wavelength conversion material that corresponds to the wavelength conversion material 440 of FIG. 1, a material receiver 410A, and a coupling member 420. The material receiver 410A may correspond to an embodiment of the material receiver 410 shown in FIG. 1 and perform a same function as the material receiver 410 shown in FIG. 1.

The material receiver 410A may include a top holder 412 and a bottom holder 414. The top holder 412 may define an upper part or portion of a material receiving space to receive the wavelength conversion material. The bottom holder 414 may define a lower part or portion of the material receiving space to receive the wavelength conversion material. The material receiving space to receive the wavelength conversion material may be defined by a coupling of the top holder 412 and the bottom holder 414. The wavelength conversion material may be fixed by the top holder 412 and the bottom holder 414. The bottom holder 414 may fix the wavelength conversion material such that the wavelength conversion material cannot be separated from the top holder 412.

Figure 19A:
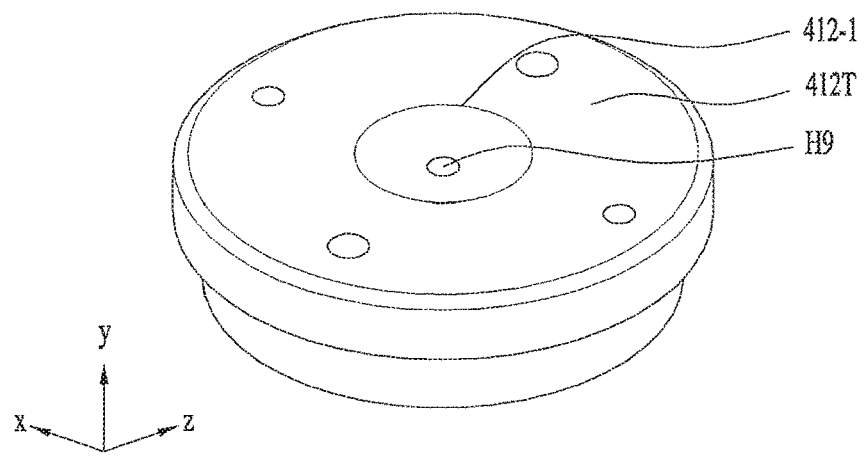
FIG. 19A to FIG. 19G are views showing various shapes of a top holder.
Figure 19B:
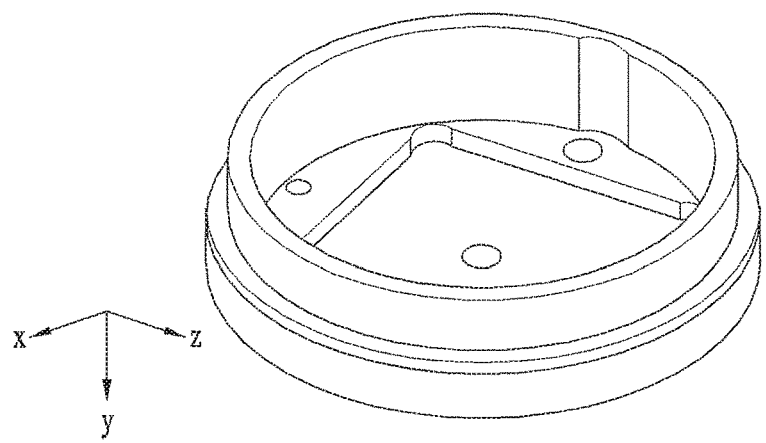
Figure 19C:
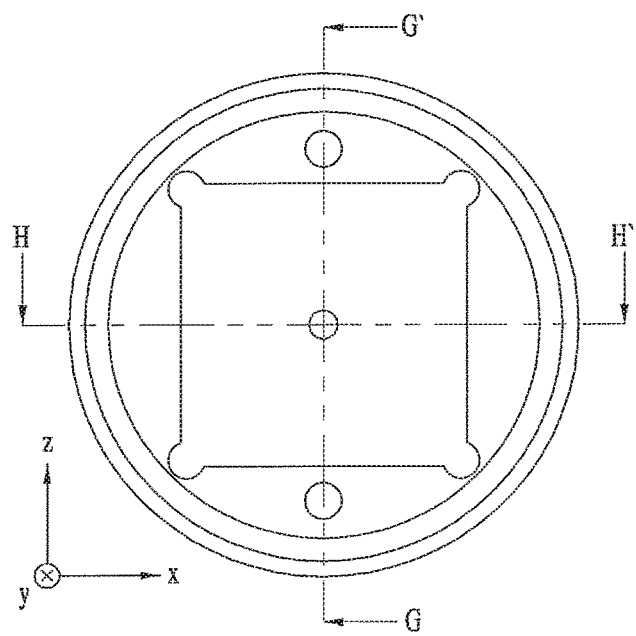
Figure 19D:
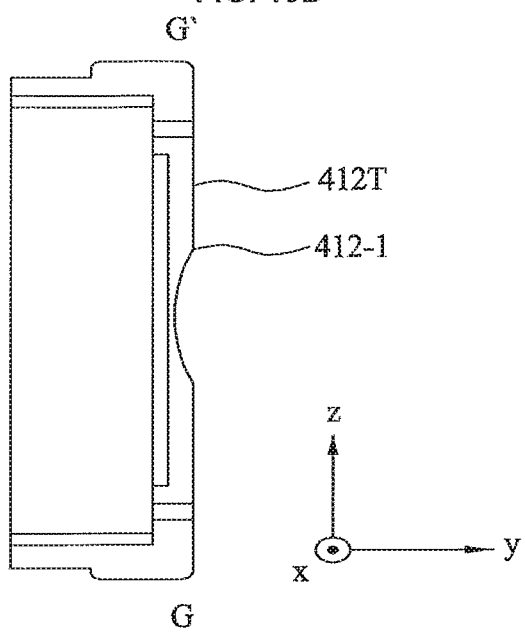
Figure 19E:
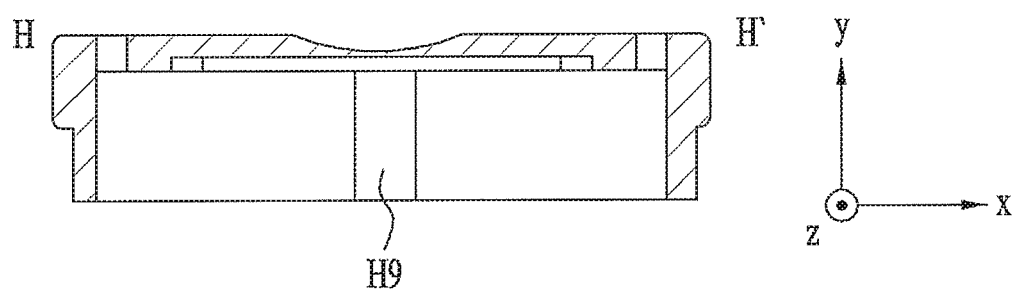
Figure 19F:
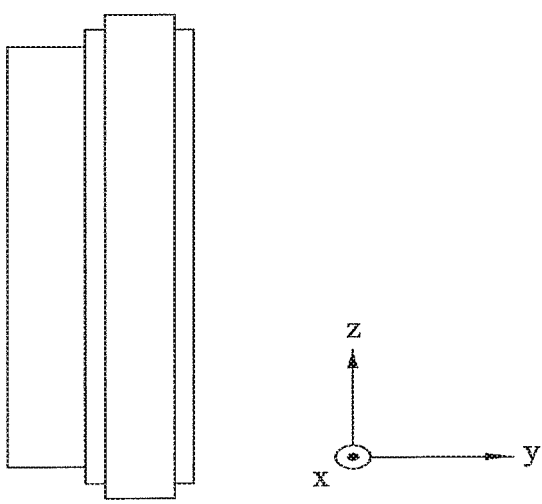
Figure 19G:
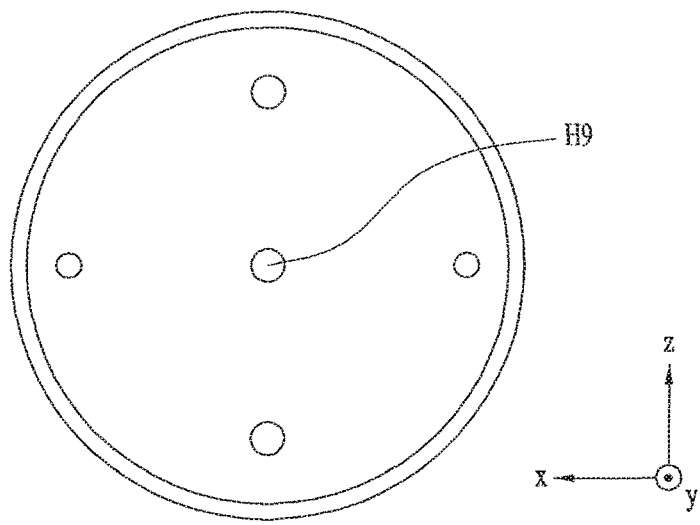

FIG. 19A to FIG. 19G are views showing various shapes of the top holder 412. FIG. 19A is an upper perspective view of the top holder 412, FIG. 19B is a lower perspective view of the top holder 412, FIG. 19C is a bottom view of the top holder 412, FIG. 19D is a sectional view taken along line G-G' of the top holder 412 shown in FIG. 19C, FIG. 19E is a sectional view taken along line H-H' of the top holder 412 shown in FIG. 19C, FIG. 19F is a front view of the top holder 412, and FIG. 19F is a plan view of the top holder 412.

Referring to FIG. 19A to FIG. 19G, the top holder 412 may be provided in a center 412-1 thereof with a hole H9 as an exit. The hole H9 may correspond to the exit through which light having a wavelength converted by the wavelength conversion material is output. The hole H9 formed in the center 412-1 may have a sectional shape inclined from the top 412T of the top holder 412. An end of the inclined section may have a step of about 0.3 mm. If the end of the inclined section has a step, as described above, yellow light spreading at a high angle may be blocked when light having a wavelength converted by the wavelength conversion material is output.

A size of the hole formed in the center 412-1 of the top holder 412 may be greater than a size of the light emitting area, and may be reduced to the size of the light emitting area. For example, a diameter of the hole formed in the center 412-1 of the top holder 412 may be 0.2 mm to 1.5 mm. However, embodiments are not limited thereto.

Figure 20A:
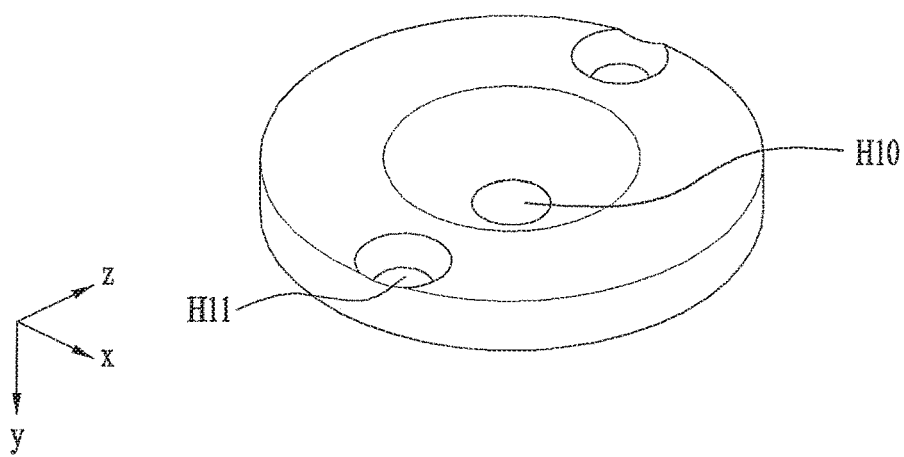
FIG. 20A to FIG. 20E are views showing various shapes of a bottom holder.
Figure 20B:
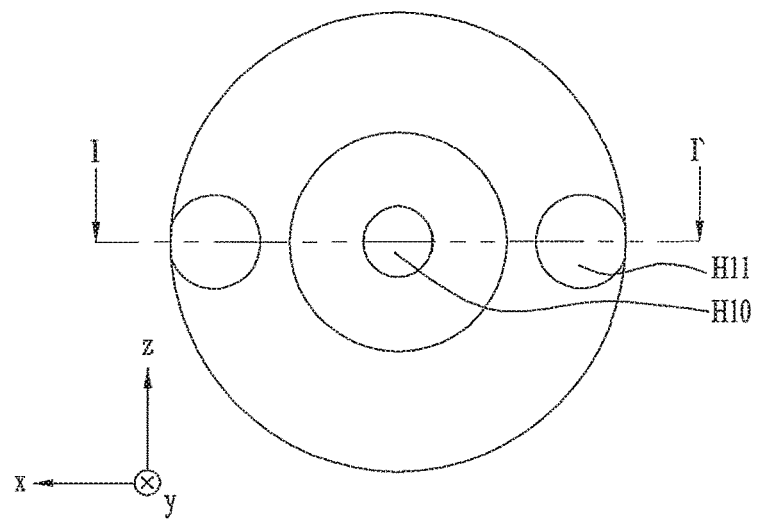
Figure 20C:
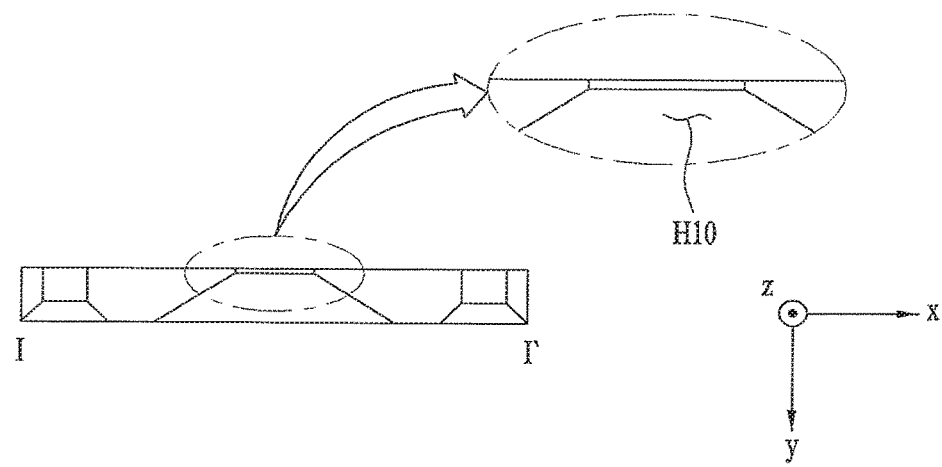
Figure 20D:
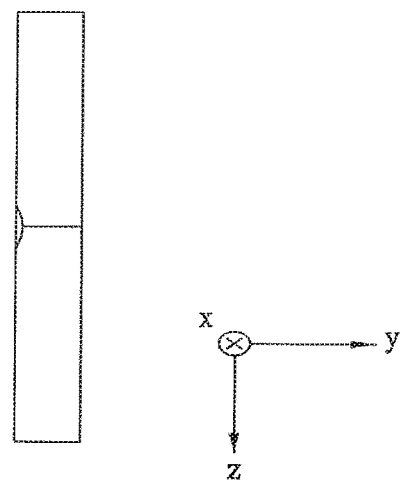
Figure 20E:
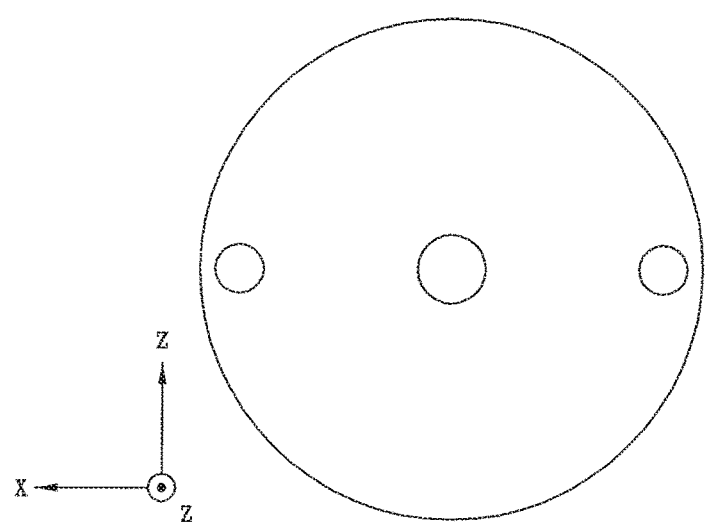

FIG. 20A to FIG. 20E are views showing various shapes of the bottom holder 414. FIG. 20A is a lower perspective view of the bottom holder 414, FIG. 20B is a bottom view of the bottom holder 414, FIG. 20C is a sectional view taken along line I-I' of the bottom holder 414 shown in FIG. 20B, FIG. 20D is a front view of the bottom holder 414, and FIG. 20E is a plan view of the bottom holder 414.

Referring to FIG. 20A to FIG. 20E, the bottom holder 414 may include a hole H10 formed in a center thereof and holes H11 formed in an edge thereof. The single beam reflected by the reflection device 320A may advance the wavelength conversion material through the hole H10. Screws may be inserted through the holes H11 such that the top holder 412 and the bottom holder 414 may be coupled to each other.

The housing 100 may receive the light source device 200A, the light transmission device 300A, and the wavelength conversion device 400A. The housing 100 may include a main base 110, a main cover 120, and a wavelength base 130. The main base 110 may define the bottom of the light emitting apparatus 1000A. The main base 110 may support the light source device 200A, the light transmission device 300A, and the wavelength conversion device 400A.

Figure 21C:
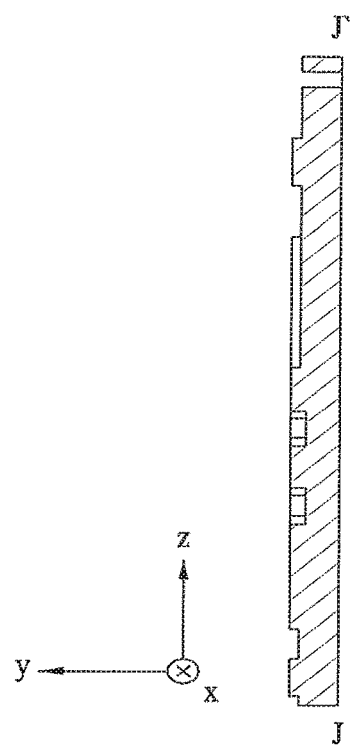
Figure 21D:
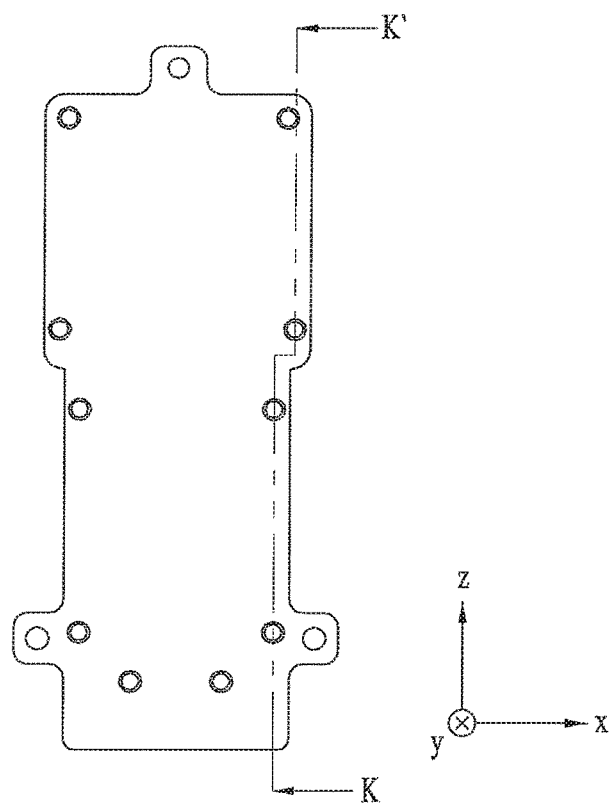
Figure 21E:
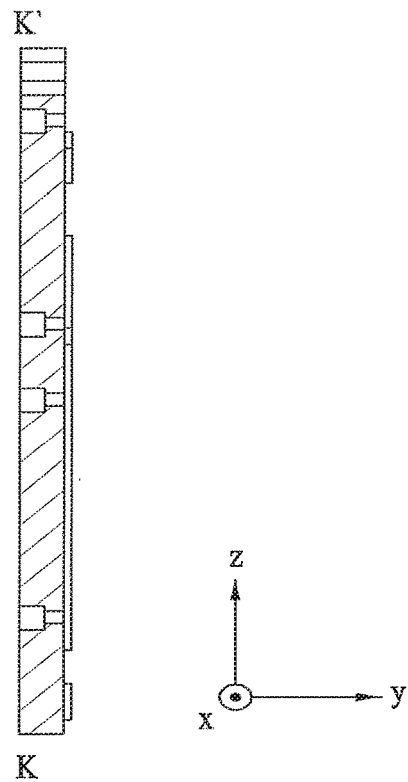
Figure 21F:
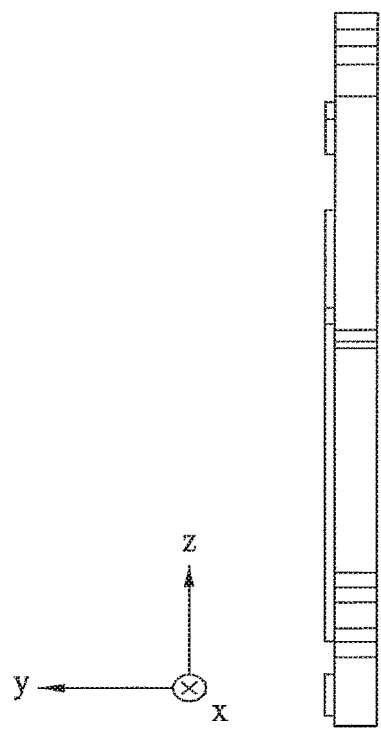
Figure 21G:
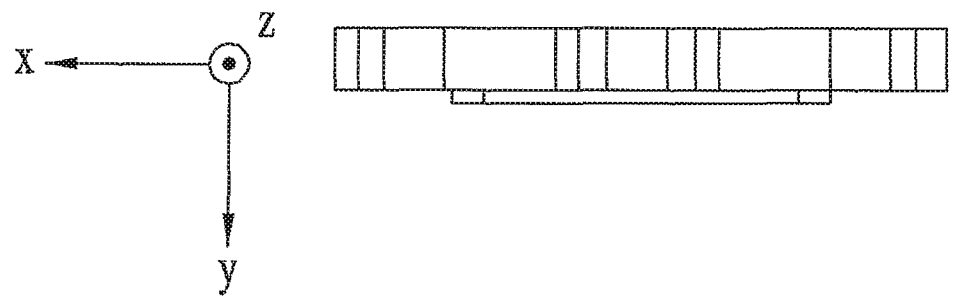
Figure 21H:
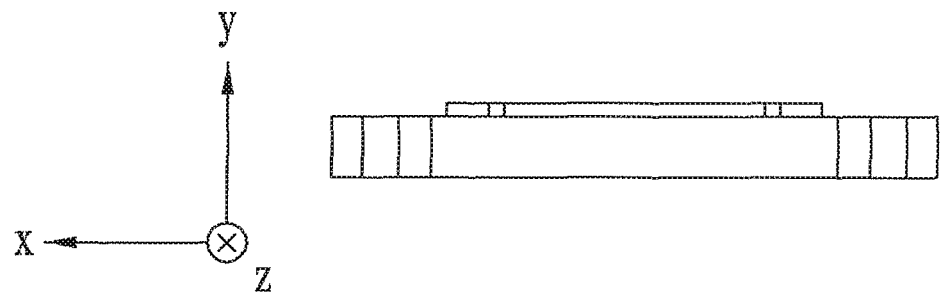

FIG. 21A to FIG. 21H are views showing various shapes of the main base 110. FIG. 21A is an upper perspective view of the main base 110, FIG. 21B is a plan view of the main base 110, FIG. 21C is a sectional view taken along line J-J' of the main base 110 shown in FIG. 21B, FIG. 21D is a bottom view of the main base 110, FIG. 21E is a sectional view taken along line K-K' of the main base 110 shown in FIG. 21D, FIG. 21F is a front view of the main base 110, FIG. 21G is a right side view of the main base 110, and FIG. 21H is a left side view of the main base 110.

Referring to FIG. 21A to FIG. 21H, the main base 110 may include various areas A230, A330, and A320. The area A230 may be an area in which the light source base 230 is provided, the area A330 may be an area in which the path holder 330 is provided, and the area A320 may be an area in which the reflection device 320A is provided. The main base 110 may include various screw holes H8 and H12, etc., formed in the side thereof in order to support and fix the light source device 200A and the light transmission device 300A.

Referring to FIG. 5, the screw S2 may be inserted through the hole H8 formed in the main base 110 and the hole H7 formed in the reflection holder 340 such that the reflection holder 340 may be fastened to the main base 110. A screw S3 may be inserted through the hole H12 formed in the main base 110 and the hole H5-2 formed in the path holder 330 shown in FIG. 16A such that the path holder 330 may be fastened to the main base 110.

The main base 110 may support the light source base 230 of the light source device 200A and the path holder 220 of the light transmission device 300A and, in addition, support the reflection device 320a through the reflection holder 340. The main cover 120 may be fastened to the main base 110 to define a space to receive the light source device 200A and at least a portion of the light transmission device 300A.

Figure 22A:
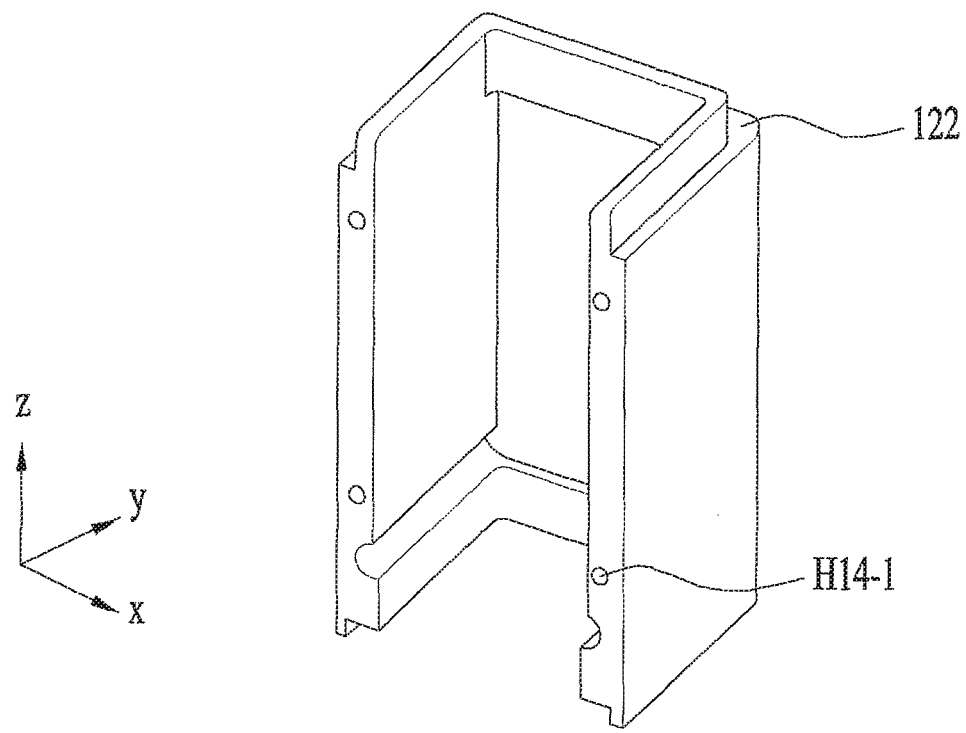
FIG. 22A to 22G are views showing various shapes of a main cover.
Figure 22B:
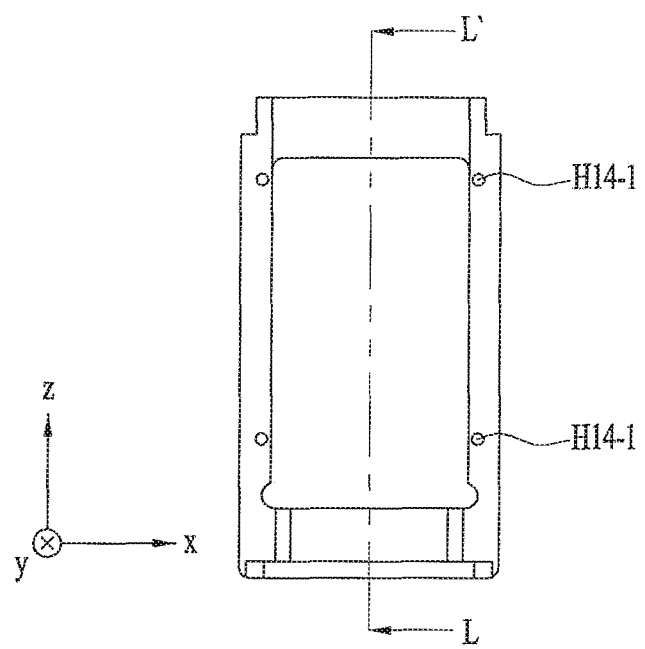
Figure 22C:
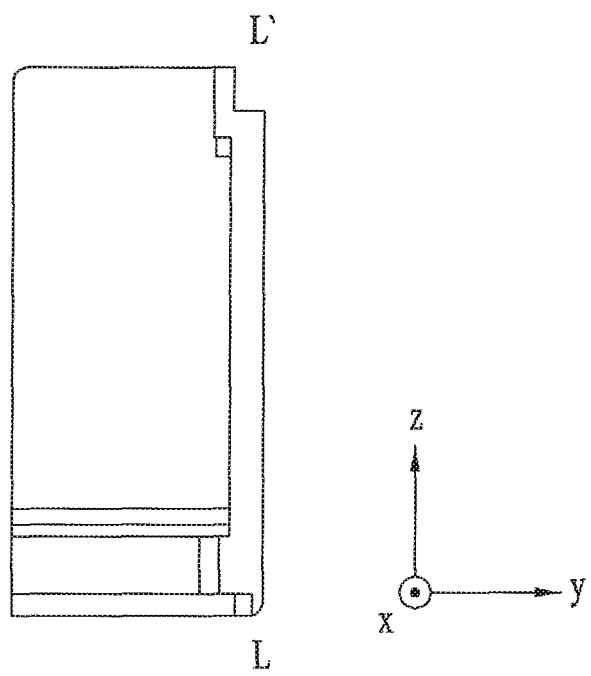
Figure 22D:
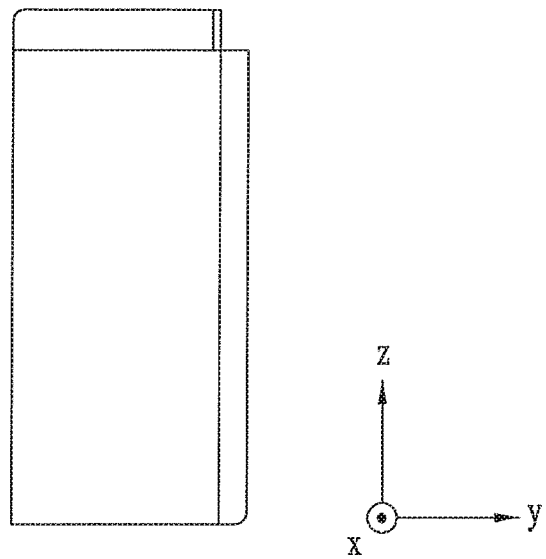
Figure 22E:
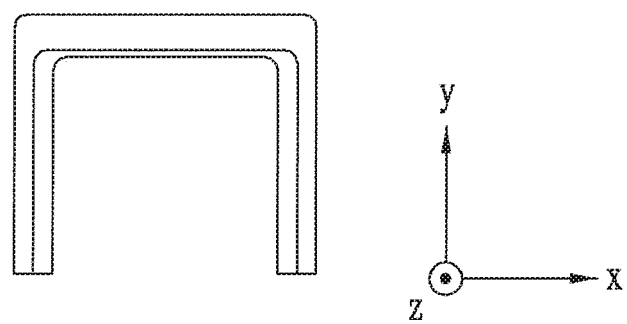
Figure 22F:
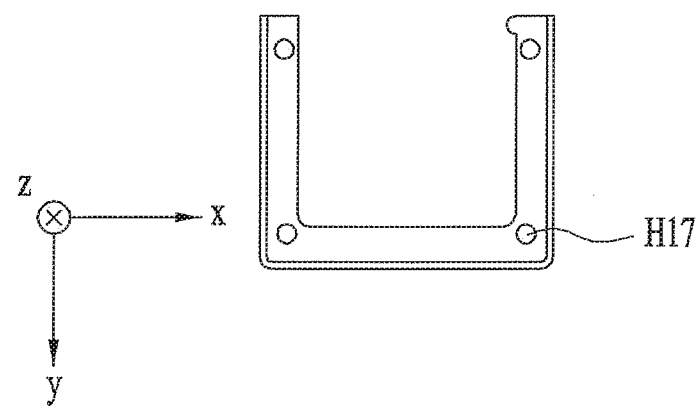
Figure 22G:
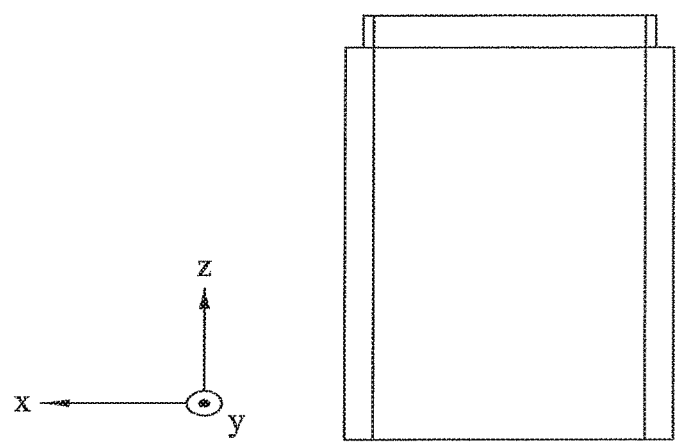

FIG. 22A to FIG. 22G are views showing various shapes of the main cover 120. FIG. 22A is a lower perspective view of the main cover 120, FIG. 22B is a bottom view of the main cover 120, FIG. 22C is a sectional view taken along line L-L' of the main cover 120 shown in FIG. 22B, FIG. 22D is a rear view of the main cover 120, FIG. 22E is a right side view of the main cover 120, FIG. 22F is a left side view of the main cover 120, and FIG. 22G is a plan view of the main cover 120.

Referring to FIG. 22A and FIG. 22B, the main cover 120 may be fastened to the main base 110 by screw engagement. For example, a screw S4 shown in FIG. 5 may be inserted through a hole H14-2 formed in the main base 110 and a hole H14-1 formed in the main cover 120 such that the main cover 120 may be fastened to the main base 110. Referring to FIG. 4 and FIG. 5, the light source device 200A, the path holder 330, the path conversion device 310A, and a portion of the reflection device 320A of the light transmission device 300A may be received in a space defined by a coupling of the main cover 120 and the main base 110.

The wavelength base 130 may be fastened to the main base 110. The wavelength base 130 may define a space to receive remaining members or components of the light transmission device 300A, such as, e.g., a remaining portion of the reflection device 320A and the reflection holder 340, which may not be received in the space defined by the coupling of the main cover 120 and the main base 110. The wavelength base 130 may define a space to receive the wavelength conversion device 400A.

Figure 23A:
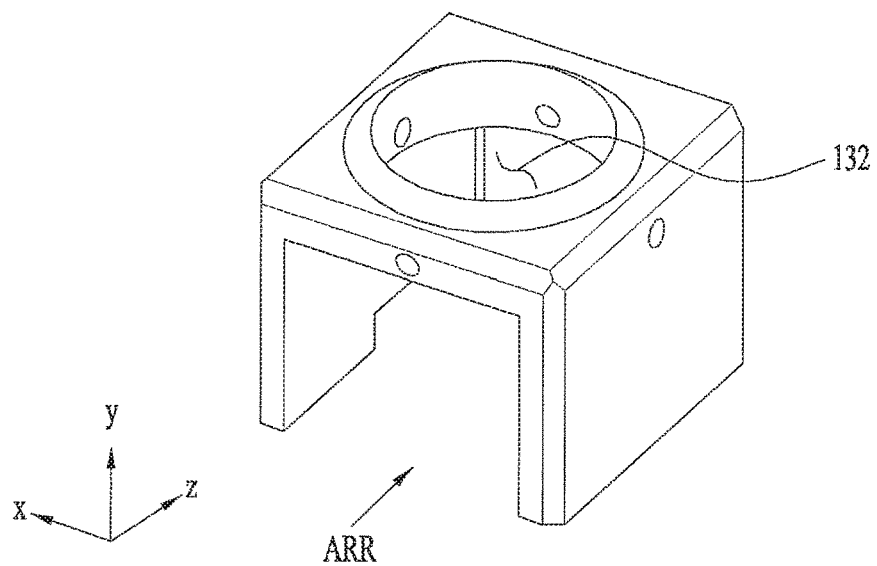
FIG. 23A to FIG. 23I are views showing various shapes of a wavelength base.
Figure 23B:
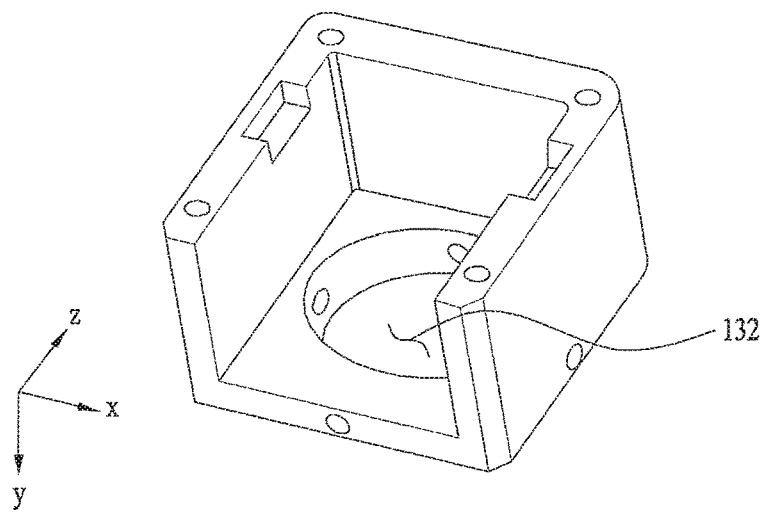
Figure 23C:
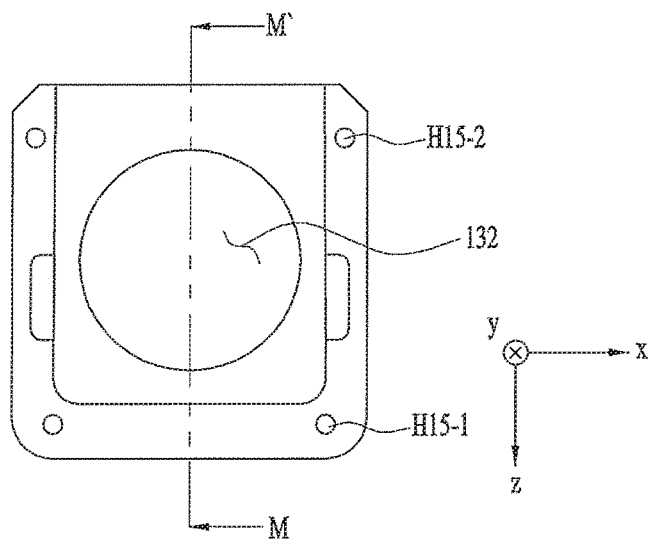
Figure 23D:
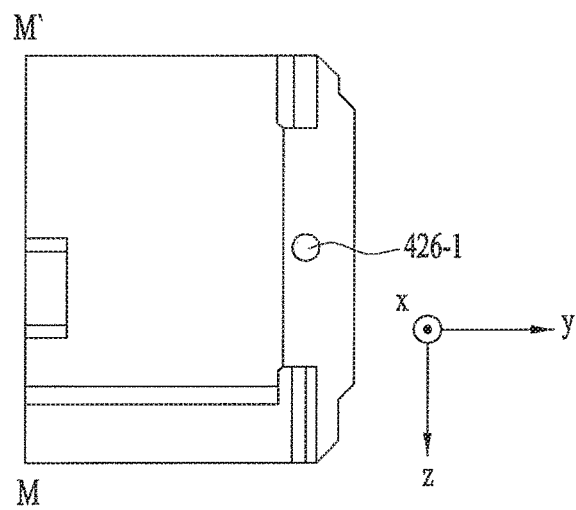
Figure 23E:
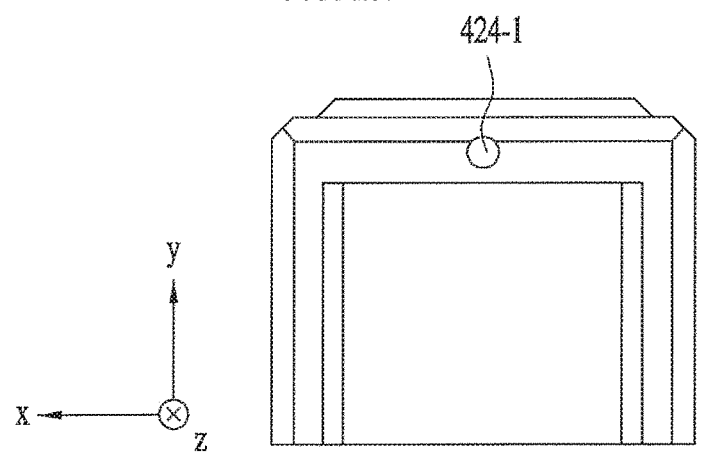
Figure 23F:
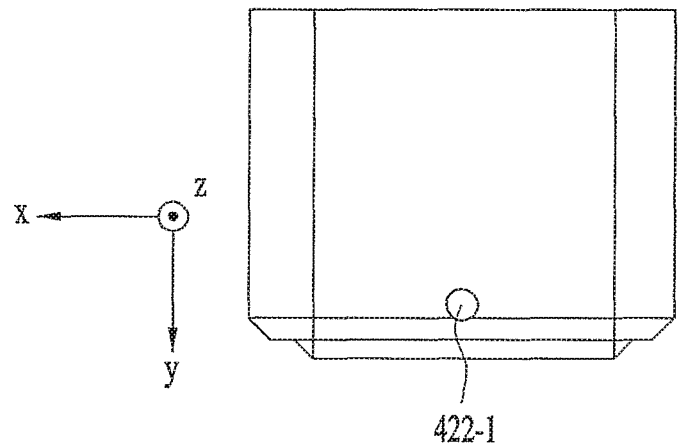
Figure 23G:
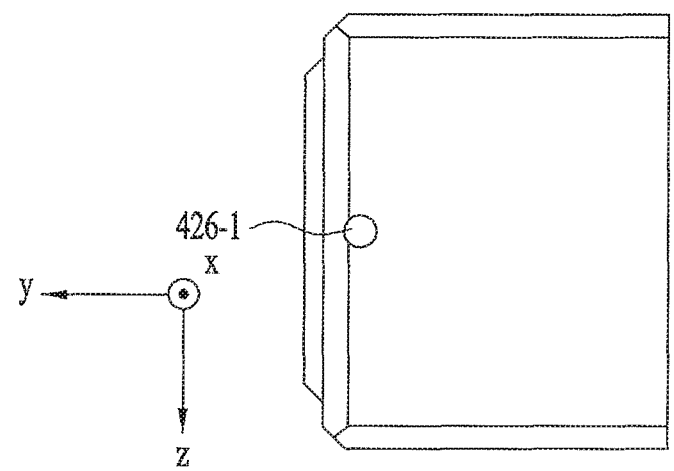
Figure 23H:
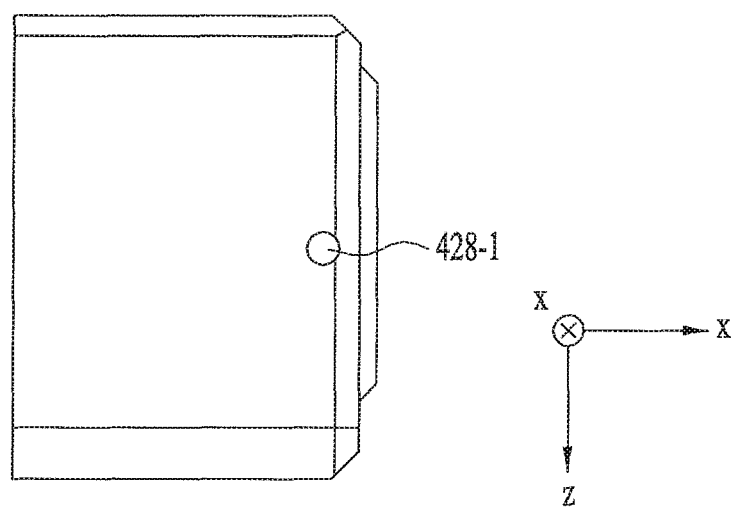
Figure 23I:
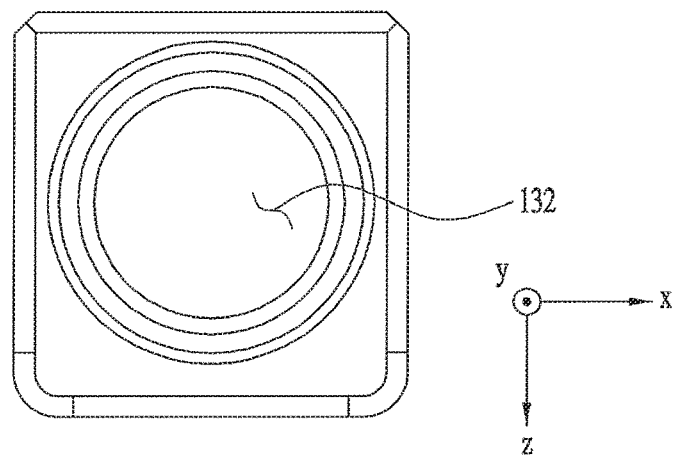

FIG. 23A to FIG. 23I are views showing various shapes of the wavelength base 130. FIG. 23A is an upper perspective view of the wavelength base 130, FIG. 23B is a lower perspective view of the wavelength base 130, FIG. 23C is a bottom view of the wavelength base 130, FIG. 23D is a sectional view taken along line M-M' of the wavelength base 130 shown in FIG. 23C, FIG. 23E is a left side view of the wavelength base 130, FIG. 23F is a right side view of the wavelength base 130, FIG. 23G is a rear view of the wavelength base 130, FIG. 23H is a front view of the wavelength base 130, and FIG. 23I is a plan view of the wavelength base 130.

Referring to FIG. 23C, the wavelength base 130 may include holes H15-1 and H15-2. The main base 110 shown in FIG. 21B may include holes H16-1 and H16-2. A screw S5 may be inserted through the hole H16-1 shown in FIG. 21B and the hole H15-1 shown in FIG. 23C, and a screw S1 may be inserted through the hole H16-2 and the hole H15-2 such that the wavelength base 130 may be coupled to the main base 110.

The wavelength base 130 may include a receiving space 132 to receive and to fasten the wavelength conversion device 400A defined in an upper part thereof. The receiving space 132 may be formed in the upper part of the wavelength base 130 so as to have a circular and passing-through hole shape. The material receiver 410A may be coupled to the wavelength base 130 in various manners. For example, if the material receiver 410A is coupled to the wavelength base 130 by screws, the wavelength conversion device 400A may include a coupling member 420. The coupling member 420 may include a plurality of screws 422, 424, 426, and 428. The four screws 422, 424, 426, and 428 may be respectively inserted into screw holes 422-1, 424-1, 426-1, and 428-1 formed in the wavelength base 130 such that the wavelength conversion device 400A, specifically the material receiver 410A, may be fixed and coupled to the wavelength base 130.

The top holder 412 may be coupled to the wavelength base 130 by screws such that a position of the focus corresponding to F of FIG. 1 located on the center of the wavelength conversion material received in the material receiver 410A may be moved in the y-axis direction. The y-axis height of the focus may be adjusted using a screw, and then the top holder 412 may be fixed to the wavelength base 130 using the four screws 422, 424, 426, and 428. In other embodiments, the top holder 412 may be fastened to the wavelength base 130 without adjusting the position of the focus, and then top holder 412 may be fixed to the wavelength base 130 using a bonding agent, instead of using the screws 422, 424, 426, and 428.

As shown in FIG. 1, the wavelength base 130 may be aligned with and coupled with the main base 110 such that the focus F may be located on the center of the wavelength conversion material 440. The remaining portion of the reflection device 320A and the reflection holder 340 may be received in a space formed by the coupling of the wavelength base 130 and the main base 110. As previously described, a portion of the reflection device 320A may be received in a receiving space defined by the coupling of the main base 110 and the main cover 120. However, embodiments are not limited thereto.

The main cover 120 shown in FIG. 22A and the wavelength base 130 shown in FIG. 23A may be coupled to each other by fitting. As shown in FIG. 22A, the front end of the entrance of the main cover 120 may have a step 122, and the main cover 120 may be fitted into the entrance of the wavelength base 130 shown in FIG. 23A in a direction indicated by an arrow ARR such that the main cover 120 and the wavelength base 130 may be coupled to each other.

The main cover 120 may be coupled to the main base 110 together with the wavelength base 130 in order to define a space to receive the light source device 200A, the light transmission device 300A, and the wavelength conversion device 400A. The members or components 200A, 300A, and 400A received in this space may not be contaminated by moisture or dust. For example, blue light excited at the space formed by the light source device 200A, the light transmission device 300A, and the wavelength conversion device 400A may be prevented from being exposed to an outside.

In the previous embodiment, the main cover 120 and the wavelength base 130 may be formed separately and coupled to the main base 110. However, embodiments are not limited thereto. In other embodiments, the main cover 120 and the wavelength base 130 may be integrally formed and coupled to the main base 110. When the light source device 200A, the light transmission device 300A, and the wavelength conversion device 400A are connected to the corresponding areas of the housing 100, connections therebetween may be sealed.

As previously described, each of the light source device 200A, the light transmission device 300A, and the wavelength conversion device 400A may be coupled to the main base 110 by screws. However, embodiments are not limited thereto. In other embodiments, each of the light source device 200A, the light transmission device 300A, and the wavelength conversion device 400A may be coupled to the main base 110 using a bonding agent. In this case, holes formed in the respective devices for screwed and the screws may be omitted.

The housing 100 may further include a circuit cover 140. The circuit cover 140 may prevent a printed circuit board (PCB) from being exposed to the outside while protecting the PCB. The circuit cover 140 may be coupled to the main base 110 and the main cover 120 while being spaced apart from the light source cover 230.

Figure 24A:
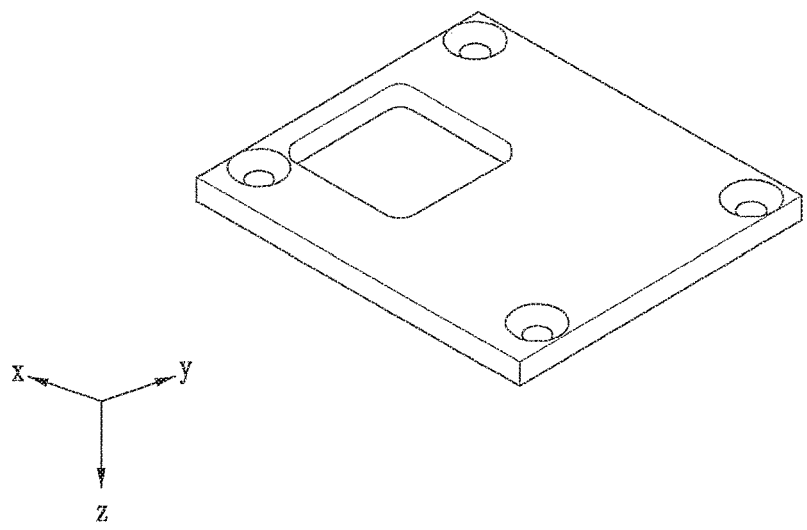
FIG. 24A to FIG. 24F are views showing various shapes of a circuit cover.
Figure 24B:
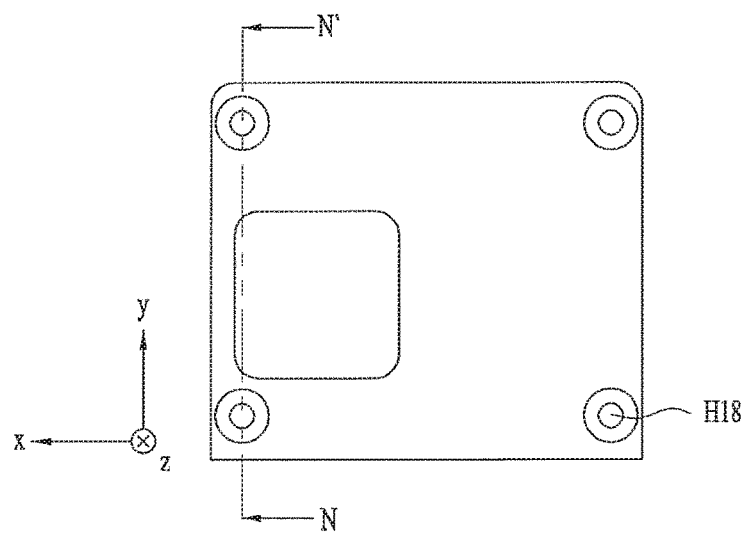
Figure 24C:
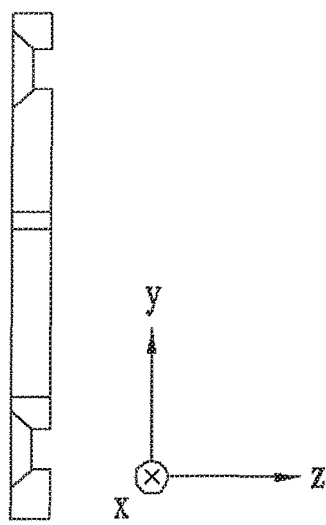
Figure 24D:
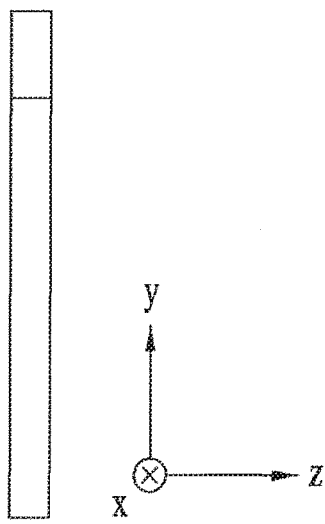
Figure 24E:
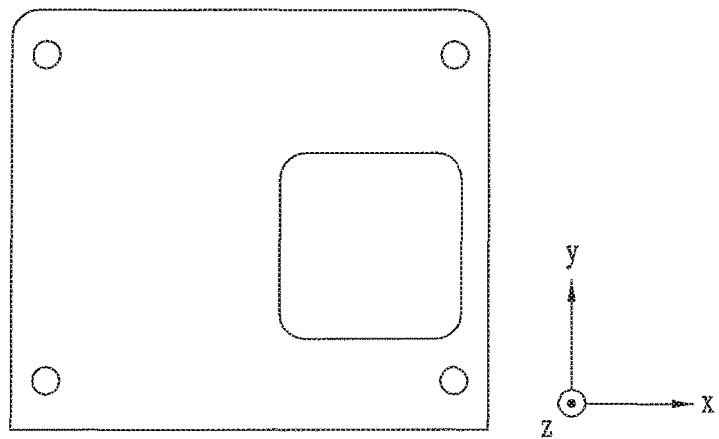
Figure 24F:
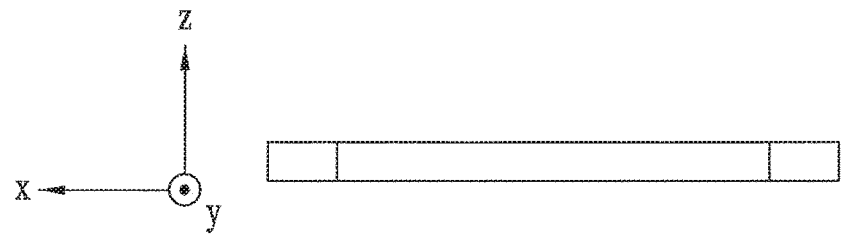

FIG. 24A to FIG. 24F are views showing various shapes of the circuit cover 140. FIG. 24A is a perspective view of the circuit cover 140, FIG. 24B is a left side view of the circuit cover 140, FIG. 24C is a sectional view taken along line N-N' of the circuit cover 140 shown in FIG. 24B, FIG. 24D is a front view of the circuit cover 140, FIG. 24E is a right side view of the circuit cover 140, and FIG. 24F is a plan view of the circuit cover 140.

As shown in FIG. 24B, the circuit cover 140 may be provided in corners thereof with holes H18, and the main cover 120 shown in FIG. 22F may be provided in the left surface thereof with holes H17. Screws may be inserted through the holes H17 and H18 such that the circuit cover 140 may be fastened to the main cover 120. However, embodiments are not limited thereto. In other embodiments, the circuit cover 140 may be coupled to the main cover 120 using a bonding agent.

Figure 25A:
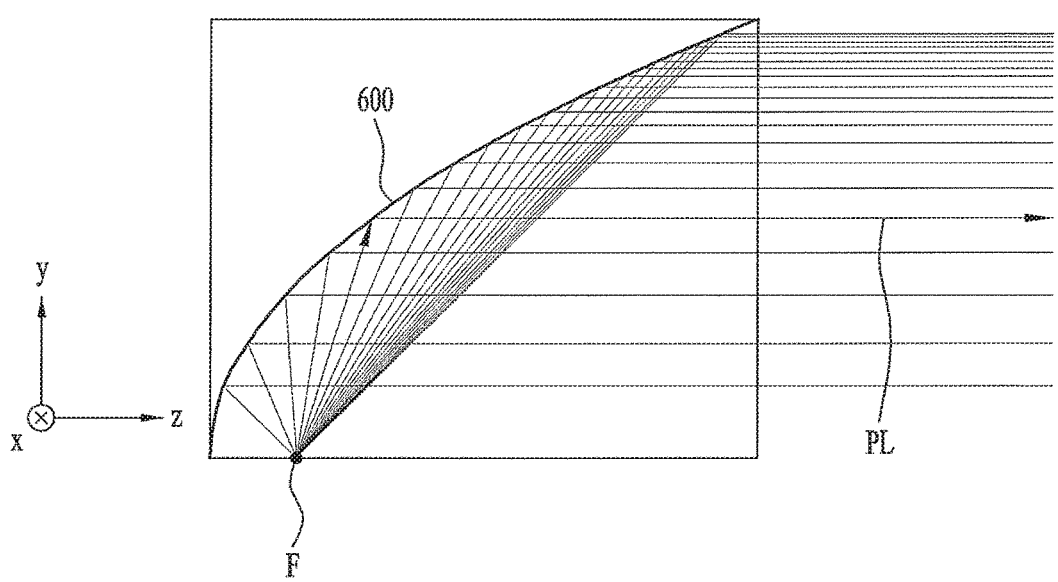
FIG. 25A and FIG. 25B are views illustrating features in which a plurality of beams may be reflected by a parabolic reflective surface.
Figure 25B:
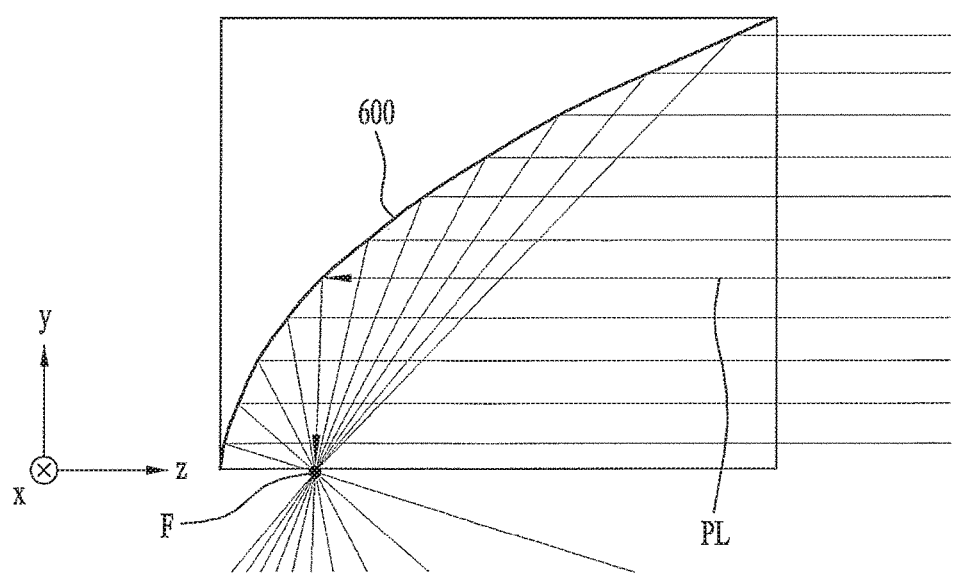

FIG. 25A and FIG. 25B are views illustrating features in which a plurality of beams is reflected by a parabolic reflective surface. Referring to FIG. 25A, beams starting from the focus F may be irradiated as parallel beams PL by a parabolic reflective surface 600 based on the characteristics of the parabolic reflective surface 600.

Referring to FIG. 25B, on the other hand, parallel beams PL incident in parallel on the parabolic reflective surface 600 may be gathered on the focus F. The beams gathered on the focus F may be spread after passing through the focus F, which may affect the function, efficiency, and manufacture of a light emitting apparatus including a plurality of light sources that emit a plurality of beams. When the parallel beams PL are reflected by the parabolic reflective surface 600 in the state in which the parallel beams PL are not gathered as a single beam and then advance to the focus F, if the path on which the reflected beams are gathered on the focus F deviates in the y-axis direction or the z-axis direction, two focuses may be present, and light efficiency of the light emitting apparatus may be reduced. A size of the beams may be increased, whereby functioning of the light emitting apparatus may be deteriorated.

If such a light emitting apparatus is manufactured, a positional tolerance of the wavelength conversion device located on the focus F may not exist. If the position of the wavelength conversion device deviates from the focus even a little, the beams may be emitted from two points. When the light emitting apparatus is manufactured, therefore, it may be difficult to align the beams, and the tolerance may be critical.

In order to solve the above problems, a light emitting apparatus according to an embodiment may gather a plurality of laser parallel beams into a single beam using polarization characteristics of laser beams emitted from a plurality of laser light sources 212 and 214, and output the single beam to the parabolic reflective surface of the reflection device 320 and 320A to 320C. The tolerance between the position of the focus and the x-axis, y-axis, and z-axis of the wavelength conversion material 440 may be alleviated, and a size of the light sources included in the light emitting apparatus 1000 and 1000A may be easily adjusted. Luminance of the light emitting apparatus 1000 and 1000A may be improved, whereby efficiency of the light emitting apparatus 1000 and 1000A may be increased, and an overall size of the light emitting apparatus 1000 and 1000A may be reduced. Furthermore, it may be possible to alleviate sensitivity in alignment of the first and second laser light sources 212 and 214 with the first and second collimation lenses 222 and 224.

As is apparent from the above description, in a light emitting apparatus according to an embodiment and an illumination apparatus including the same, the tolerance between the position of a focus and the x-axis, y-axis, and z-axis of a wavelength conversion material of a wavelength conversion device is alleviated, the size of light sources included in the light emitting apparatus may be easily adjusted. In addition, the luminance and efficiency of the light emitting apparatus are improved, and the overall size of the light emitting apparatus may be reduced. Furthermore, it is possible to alleviate sensitivity in alignment of first and second laser light sources with first and second collimation lenses.

When an element is referred to as being "on" or "under" another element, it may be directly on/under the element, and one or more intervening elements may also be present. When an element is referred to as being "on" or "under," "under the element" as well as "on the element" may be included based on the element. Relational terms, such as "first," "second," "on/upper part/above" and "under/lower part/below," may be used only to distinguish between one subject or element and another subject and element without necessarily requiring or involving any physical or logical relationship or sequence between such subjects or elements.

Light emitting apparatuses 1000 and 1000A and an illumination apparatus 2000 according to embodiments may be described using a Cartesian coordinate system (x, y, z). However, the disclosure is not limited thereto. That is, other different coordinate systems may be used. In the drawings, an x-axis, a y-axis, and a z-axis of the Cartesian coordinate system may be perpendicular to each other. However, the disclosure is not limited thereto. That is, the x-axis, the y-axis, and the z-axis may intersect each other.

Embodiments disclosed herein may provide a light emitting apparatus exhibiting excellent performance and an illumination apparatus including the same. According to an embodiment disclosed herein, a light emitting apparatus may include a light source device that emits a plurality of laser beams in parallel, a light transmission device that gathers the plurality of laser beams emitted from the light source device into a single beam and outputs the single beam to a focus, a wavelength conversion device that converts the wavelength of the single beam on the focus, and a housing to accommodate the light source device, the light transmission device, and the wavelength conversion device.

The light source device may include a first laser light source that emits a first beam of the plurality of laser beams, a second laser light source that emits a second beam of the plurality of laser beams, a first collimation lens that collimates the first beam emitted from the first laser light source, and a second collimation lens that collimates the second beam emitted from the second laser light source. The first and second laser light sources may be arranged vertically, may be arranged horizontally, or may intersect each other.

The light source device may further include a light source base to fix the first and second laser light sources, a first barrel, to which the first collimation lens may be fastened, a second barrel, to which the second collimation lens may be fastened, and first and second lens holders that align the first and second barrels with the first and second laser light sources, respectively. The first and second lens holders may tightly push the first and second laser light sources against the light source base to stick the first and second laser light sources to the light source base.

The light source device may further include a first retainer to fix the first collimation lens fastened to the first barrel and a second retainer to fix the second collimation lens fastened to the second barrel. The light source base may include a fastener fastened to the housing. The fastener of the light source base may include a thermal pad or a thermal compound. The fastener of the light source base may include a heat dissipation material.

The light transmission device may include a light path conversion device that converts paths of the first and second beams so as to gather the first and second beams into the single beam and a reflection device that reflects the single beam to the focus. The light path conversion device may include a light transmission and reflection device that transmits the first beam in a first direction and reflects the second beam, incident thereon in a second direction perpendicular to the first direction, in the first direction to output the single beam. Alternatively, the light path conversion device may include a prism that reflects the second beam, incident thereon in a direction parallel to a first direction in which the first beam is incident thereon, in a second direction perpendicular to the first direction and a light transmission and reflection device that transmit the first beam in the first direction and reflects the second beam, reflected by the prism in the second direction, in the first direction to output the single beam.

The light transmission and reflection device may include a polarization beam splitter or a double refraction material. The light transmission device may further include a path holder to fix the light path conversion device. The reflection device may have a parabolic sectional shape. The light transmission device may further include a reflection holder to fix the reflection device to the housing.

The wavelength conversion device may include a wavelength conversion material that converts the wavelength of the single beam, the focus being located on a center of the wavelength conversion material and a material receiver including a material receiving space to receive the wavelength conversion material, the material receiver being provided with an exit through which light having a wavelength converted by the wavelength conversion material may be output.

The material receiver may include a top holder to define an upper portion of the material receiving space, the top holder being provided in a center thereof with a hole as the exit, and a bottom holder to define the lower portion of the material receiving space with the top holder. The hole formed in the center may have a sectional shape inclined from the top of the top holder, and an end of the inclined section may have a step.

The top holder may be coupled to the wavelength base by screws such that a position of the focus located on the center of the wavelength conversion material may be moved in the direction in which the single beam is reflected by the reflection device. The housing may include a main base to support the light source device, the light transmission device, and the wavelength conversion device, the main base corresponding to the bottom of the light emitting apparatus, a main cover fastened to the main base to define a space to receive the light source device and at least a portion of the light transmission device, and a wavelength base fastened to the main base to define a space to receive a remaining portion of the light transmission device and to define a space to receive the wavelength conversion device.

The main base may support the light source base and the reflection device. The wavelength base may be aligned with and coupled to the main base such that the focus is located on the center of the wavelength conversion material. Connections of each of the light source device, the light transmission device, and the wavelength conversion device to the housing may be sealed. Each of the light source device, the light transmission device, and the wavelength conversion device may be coupled to the main base by screws or by bonding. An illumination apparatus may include the light emitting apparatus with the above-stated construction, and an illumination reflector that reflects wavelength-converted light output from the focus of the light emitting apparatus such that the wavelength-converted light may be output.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting apparatus, comprising:
    a light source device that emits a plurality of laser beams in parallel;
    a light transmission device that gathers the laser beams emitted from the light source device into a single beam and outputs the single beam to a focus;
    a wavelength conversion device that converts a wavelength of the single beam on the focus; and
    a housing to accommodate the light source device, the light transmission device, and the wavelength conversion device,
    wherein the light source device includes:
        a first laser light source that emits a first beam of the plurality of laser beams;
        a second laser light source that emits a second beam of the plurality of laser beams;
        a first collimation lens that collimates the first beam emitted from the first laser light source;
        a second collimation lens that collimates the second beam emitted from the second laser light source,
        a light source base to fix the first and second laser light sources;
        a first barrel to which the first collimation lens is fastened;
        a second barrel to which the second collimation lens is fastened; and
        first and second lens holders that align the first and second barrels with the first and second laser light sources, respectively.

2. The light emitting apparatus according to claim 1, wherein the light source device further includes:
    a first retainer to fix the first collimation lens fastened to the first barrel; and
    a second retainer to fix the second collimation lens fastened to the second barrel.

3. The light emitting apparatus according to claim 1, wherein the light source base includes a fastener fastened to the housing.

4. The light emitting apparatus according to claim 3, wherein the fastener of the light source base includes a thermal pad or a thermal compound.

5. The light emitting apparatus according to claim 3, wherein the fastener of the light source base includes a heat dissipation material.

6. The light emitting apparatus according to claim 1, wherein the light transmission device includes:
    a light path conversion device that converts paths of the first and second beams so as to gather the first and second beams into the single beam; and
    a reflection device that reflects the single beam to the focus.

7. The light emitting apparatus according to claim 6, wherein the light path conversion device includes a light transmission and reflection device that transmits the first beam in a first direction and reflects the second beam, incident thereon in a second direction perpendicular to the first direction, in the first direction to output the single beam.

8. The light emitting apparatus according to claim 6, wherein the light path conversion device includes:
   a prism that reflects the second beam, incident thereon in a direction parallel to a first direction in which the first beam is incident thereon, in a second direction perpendicular to the first direction; and
   a light transmission and reflection device that transmits the first beam in the first direction and reflects the second beam, reflected by the prism in the second direction, in the first direction to output the single beam.

9. The light emitting apparatus according to claim 6, wherein the light transmission device further includes a path holder to fix the light path conversion device.

10. The light emitting apparatus according to claim 6, wherein the light transmission device further includes a reflection holder to fix the reflection device to the housing.

11. The light emitting apparatus according to claim 6, wherein the wavelength conversion device includes:
   a wavelength conversion material that converts a wavelength of the single beam, the focus being located on a center of the wavelength conversion material; and
   a material receiver having a material receiving space to receive the wavelength conversion material, the material receiver being provided with an exit through which light having a wavelength converted by the wavelength conversion material is output.

12. The light emitting apparatus according to claim 11, wherein the material receiver includes:
   a top holder defining an upper portion of the material receiving space, the top holder being provided in a center thereof with a hole as the exit; and
   a bottom holder defining a lower portion of the material receiving space with the top holder.

13. The light emitting apparatus according to claim 11, wherein the housing includes:
   a main base to support the light source device, the light transmission device, and the wavelength conversion device, the main base corresponding to a bottom of the light emitting apparatus;
   a main cover fastened to the main base to define a space to receive the light source device and at least a portion of the light transmission device; and
   a wavelength base fastened to the main base to define a space to receive a remaining portion of the light transmission device and a space to receive the wavelength conversion device.

14. The light emitting apparatus according to claim 13, wherein the main base supports the light source base and the reflection device.

15. The light emitting apparatus according to claim 13, wherein the wavelength base is aligned with and coupled to the main base such that the focus is located on the center of the wavelength conversion material.

16. The light emitting apparatus according to claim 13, wherein connections of each of the light source device, the light transmission device, and the wavelength conversion device to the housing are sealed.

17. The light emitting apparatus according to claim 13, wherein each of the light source device, the light transmission device, and the wavelength conversion device are coupled to the main base by screws or by bonding.

18. An illumination apparatus, comprising:
   the light emitting apparatus according to claim 1; and
   an illumination reflector that reflects wavelength-converted light output from the focus of the light emitting apparatus such that the wavelength-converted light is output.

* * * * *